United States Patent
Tanaka

(10) Patent No.: US 9,257,114 B2
(45) Date of Patent: Feb. 9, 2016

(54) ELECTRONIC DEVICE, INFORMATION PROCESSING APPARATUS, AND METHOD FOR CONTROLLING THE SAME

(71) Applicant: CANON KABUSHIKI KAISHA, Tokyo (JP)

(72) Inventor: Tomonori Tanaka, Ageo (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 13/937,357

(22) Filed: Jul. 9, 2013

(65) Prior Publication Data

US 2014/0019136 A1 Jan. 16, 2014

(30) Foreign Application Priority Data

Jul. 12, 2012 (JP) ................................. 2012-156925

(51) Int. Cl.
*G10L 13/00* (2006.01)
*G06F 3/01* (2006.01)

(52) U.S. Cl.
CPC ................ *G10L 13/00* (2013.01); *G06F 3/013* (2013.01)

(58) Field of Classification Search
CPC ................................ G06F 3/013; G10L 13/00
See application file for complete search history.

(56) References Cited

U.S. PATENT DOCUMENTS

| | | | | |
|---|---|---|---|---|
| 5,731,805 A | * | 3/1998 | Tognazzini et al. | 345/156 |
| 6,195,640 B1 | * | 2/2001 | Mullaly et al. | 704/260 |
| 8,893,164 B1 | * | 11/2014 | Teller | 725/12 |
| 2006/0256083 A1 | * | 11/2006 | Rosenberg | 345/156 |
| 2011/0205148 A1 | * | 8/2011 | Corriveau et al. | 345/156 |
| 2012/0001923 A1 | * | 1/2012 | Weinzimmer et al. | 345/473 |
| 2012/0105486 A1 | * | 5/2012 | Lankford et al. | 345/661 |
| 2014/0019136 A1 | * | 1/2014 | Tanaka | 704/260 |

FOREIGN PATENT DOCUMENTS

JP 2007-102360 A 4/2007

* cited by examiner

*Primary Examiner* — Samuel G Neway
(74) *Attorney, Agent, or Firm* — Fitzpatrick, Cella, Harper & Scinto

(57) ABSTRACT

The present invention provides a technology for enabling a natural voice reproduction in which, depending on a gazed character position, a position of a voice output character follows but not excessively reacts with the gazed character position. Therefore, in an electronic device provided with a display unit for displaying text on a screen, a voice outputting unit for outputting the text as voice, and a sight-line detection unit for detecting a sight-line direction of a user, a control unit changes a starting position at which a voice outputting unit starts voice output if a distance between the position of the current output character and the position of the current gazed character is a preset threshold or more.

18 Claims, 23 Drawing Sheets

FIG. 6A

| PAGE NUMBER | LINE NUMBER | CHARACTER NUMBER FROM BEGINNING OF LINE |
|---|---|---|
| 5 | 1 | 1 |

FIG. 6B

| PAGE NUMBER | LINE NUMBER | CHARACTER NUMBER FROM BEGINNING OF LINE |
|---|---|---|
| 5 | 2 | 4 |

FIG. 6C

| PAGE NUMBER | LINE NUMBER | CHARACTER NUMBER FROM BEGINNING OF LINE |
|---|---|---|
| 5 | 2 | 5 |

FIG. 6D

| PAGE NUMBER | LINE NUMBER | CHARACTER NUMBER FROM BEGINNING OF LINE |
|---|---|---|
| 5 | 3 | 10 |

F I G. 7A

| PAGE NUMBER | LINE NUMBER | CHARACTER NUMBER FROM BEGINNING OF LINE |
|---|---|---|
| 5 | 1 | 1 |

F I G. 7B

| PAGE NUMBER | LINE NUMBER | CHARACTER NUMBER FROM BEGINNING OF LINE |
|---|---|---|
| 5 | 4 | 1 |

F I G. 7C

| PAGE NUMBER | LINE NUMBER | CHARACTER NUMBER FROM BEGINNING OF LINE |
|---|---|---|
| 5 | 4 | 2 |

F I G. 7D

| PAGE NUMBER | LINE NUMBER | CHARACTER NUMBER FROM BEGINNING OF LINE |
|---|---|---|
| 5 | 9 | 3 |

FIG. 8A

| NUMBER OF INTERMEDIATE CHARACTER |
|---|
| 0 |

FIG. 8B

| NUMBER OF INTERMEDIATE CHARACTER |
|---|
| 17 |

FIG. 8C

| NUMBER OF INTERMEDIATE CHARACTER |
|---|
| 18 |

FIG. 8D

| NUMBER OF INTERMEDIATE CHARACTER |
|---|
| 43 |

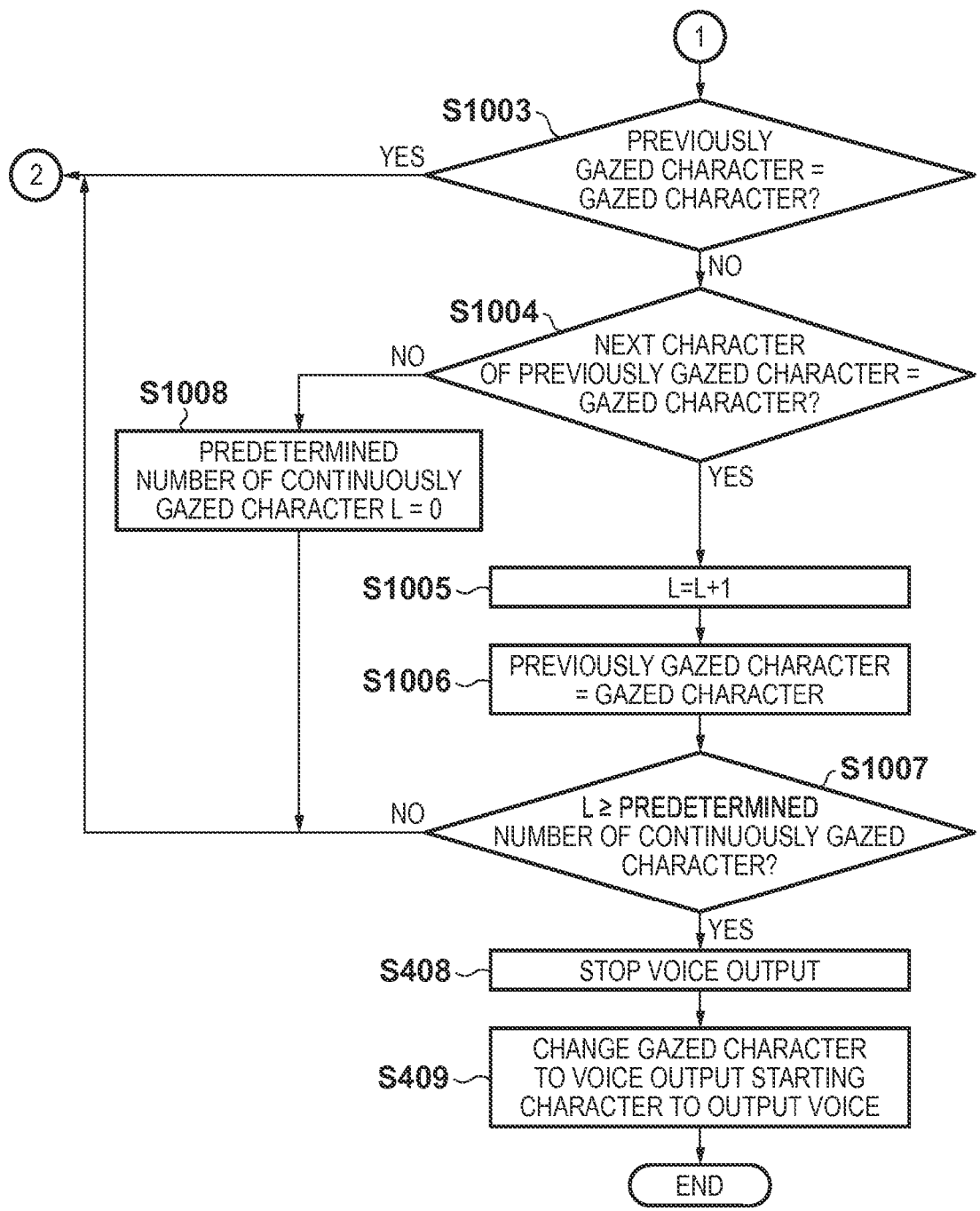

ELECTRONIC DEVICE, INFORMATION PROCESSING APPARATUS, AND METHOD FOR CONTROLLING THE SAME

BACKGROUND OF THE INVENTION

1. Field of the Invention

The present invention relates to a technology for displaying text and outputting the displayed text as voice.

2. Description of the Related Art

Conventionally, technologies for outputting electronic book contents as voice are known. Also, in order to prevent a user from easily losing the part where he or she is reading, methods for detecting a sight-line of the user, specifying a character (gazed or viewed character) that the user is gazing at on an electronic book content, and highlighting the gazed (viewed) character are known (e.g., Japanese Patent Laid-Open No. 2007-102360).

However, in the conventional art, since the position at which voice output is performed is changed while following the gazed character, the position at which voice output is performed frequently changes, thus preventing a natural voice reproduction.

SUMMARY OF THE INVENTION

The present invention was made in view of such problems. The present description provides a technology that enables a natural voice reproduction in which, depending on a gazed character position, a position of a voice output character follows the gazed character position in a non-excessive manner.

According to an aspect of this disclosure, there is provided an electronic device comprising: a display unit configured to display text on a screen; a voice outputting unit configured to output the text as voice; a sight-line detection unit configured to detect a sight-line direction of a user; and a control unit configured, assuming that a position of a character that the voice outputting unit is currently outputting as voice is defined as a position of a current output character, and a position of a character in the text that is present in the sight-line direction of the user detected by the sight-line detection unit is defined as a position of a current gazed character, to change a starting position at which the voice outputting unit starts voice output depending on a distance between the position of the current output character and the position of the current gazed character, the control unit including: a determination unit configured to determine whether or not the distance between the position of the current output character and the position of the current gazed character is a preset threshold or more; and a setting unit configured, if the determination unit determined that the distance is the threshold or more, to set the position of the current gazed character to the starting position at which the voice outputting unit starts voice output.

According to the present invention, it is possible to achieve a natural voice reproduction in which, depending on a gazed character position, a position of a voice output character follows the gazed character position in a non-excessive manner.

Further features of the present invention will become apparent from the following description of exemplary embodiments (with reference to the attached drawings).

BRIEF DESCRIPTION OF THE DRAWINGS

FIGS. 6A to 6D are diagrams illustrating examples of structures of information managed by a current voice output character storage unit 212.

FIGS. 7A to 7D are diagrams illustrating examples of structures of information managed by a gazed character specifying unit 213.

FIGS. 8A to 8D are diagrams illustrating examples of structures of information managed by a distance specifying unit 204.

FIGS. 10A and 10B are flowcharts illustrating processing performed by the information processing apparatus 101.

DESCRIPTION OF THE EMBODIMENTS

Hereinafter, embodiments for implementing the present invention will be described with reference to the drawings.

First Embodiment

Figure 1:
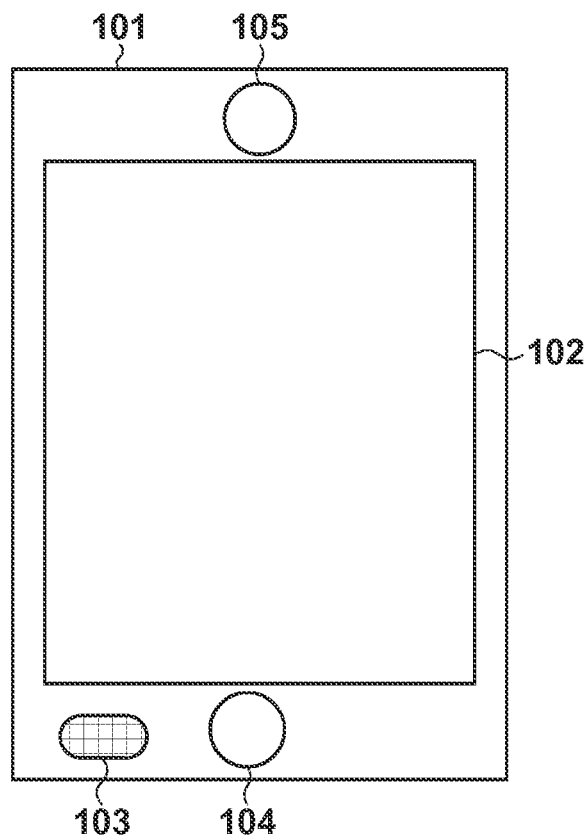
FIG. 1 is a diagram illustrating an information processing apparatus according to the present invention.

First, an external configuration of an information processing apparatus according to the present embodiment will be described with reference to FIG. 1. An information processing apparatus 101 illustrated in FIG. 1 is a portable electronic device provided with a touch panel 102, a speaker 103, a voice output button 104, and a camera 105. Note that this apparatus is not limited to having the external appearance illustrated in FIG. 1 and various external appearances are applicable, that is, for example, an arrangement of each of the touch panel 102, the speaker 103, the voice output button 104, and the camera 105 is not limited to the arrangement illustrated in FIG. 1. Also, the number of buttons, speakers, cameras, and the like may suitably be varied according to the intended purpose of the device.

The touch panel 102 is constituted by a screen (for example, a liquid crystal display device) for displaying images, characters, and the like, and a transparent film-type touch panel for coordinate detection that is arranged on the front of the screen. Therefore, the touch panel 102 has both functions for displaying various types of menus, electronic contents, and the like, and for detecting positions touched by a user. Also, the user can input a voice output instruction into the information processing apparatus 101 by pressing the voice output button 104 with his or her finger or the like. Upon detecting this voice output instruction, the information processing apparatus 101 outputs voice (e.g., voice based on PCM WAVE data sampled at 22.05 KHz) from the speaker 103. The camera 105 uses a sight-line recognition (or sight-line detection) technology to detect a sight-line direction of the user from information of the captured video, and specifies where on the touch panel 102 the user is gazing at (or observing). Therefore, when a content such as an electronic book is displayed, it is also possible to specify a character that is present on the screen in the sight-line direction. Hereinafter, a displayed character (or character string) that is present on this sight-line is referred to as a gazed character (or viewed character). In the present embodiment, by emitting infrared rays from the camera 105, center points of the pupils of the user are detected, and by tracking the center points, a slope of the sight-line direction relative to the horizontal direction is obtained. At the same time, a distance between the camera 105 and the pupils is calculated using the emission of the infrared rays, and a position on the touch panel 102 to which the sight-line is directed (sight-line position) is specified based on the distance and the slope. Also, a centroid of the sight-line positions during a predetermined time duration is regarded as a gazed position. Corresponding character regions are assigned to respective characters displayed on the touch panel 102, and the character in the character region to which the gazed position belongs is specified as a gazed character. Note that sight-line recognition technology is well known, and thus a description thereof is omitted.

In the present embodiment, it is assumed that data of an electronic book (an electronic book content or an electronic text content) and data in a voice waveform (voice waveform data) in which the electronic book is read aloud have been downloaded in advance into the information processing apparatus 101. However, the present embodiment is not limited to this, and the data may be stored in an external device and suitably downloaded as needed.

The electronic book in the present embodiment is described by the synchronized multimedia integration language (SMIL), which is a markup language conforming to W3C XML. Also, the embodiments will be described on the assumption that the electronic book that is displayed in Japanese. In the case of Japanese, a pronunciation is defined for each character to be displayed. Therefore, each character on each page of the electronic book is associated (synchronized) with a voice waveform position (position of a voice output character) in the voice waveform data where the character is spoken. That is, among the voice waveform data, voice waveform data of a given character on a given page of the electronic book can be uniquely specified. Also, from SMIL description information, for example, information on the page number, the line number, the character number from the beginning of the line, and the like can be obtained. Also, by collating the information on the page number, the line number, the character number from the beginning of the line, and the like with the SMIL description information, a position of a voice output character on the voice waveform data and a text to which the position of the voice output character belongs can be specified. SMIL technology is well known, and thus a description thereof is omitted.

Figure 2:
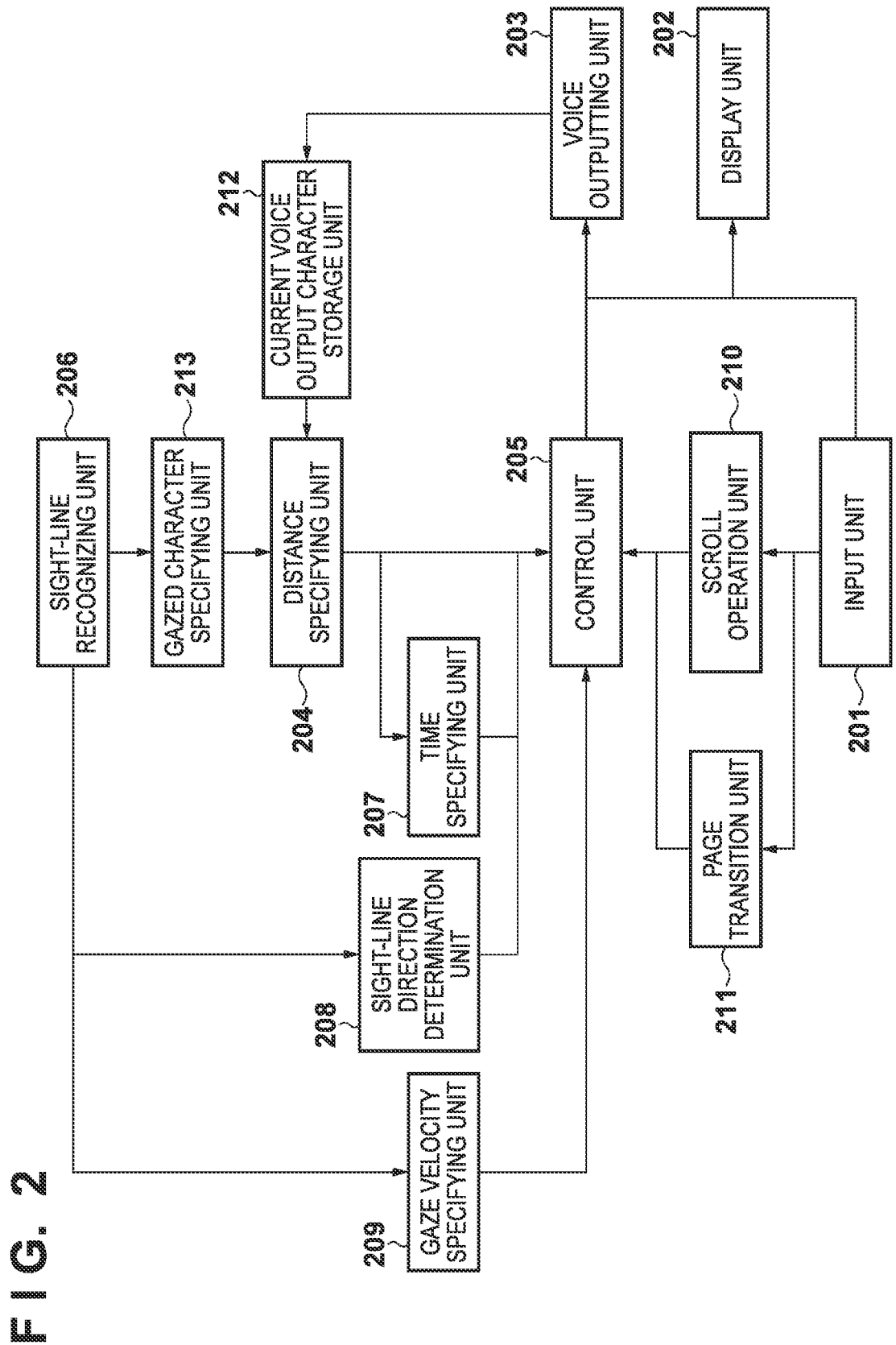
FIG. 2 is a diagram illustrating functional blocks of the information processing apparatus 101.

FIG. 2 is a functional block diagram illustrating a functional configuration of the information processing apparatus 101. Note that the configuration illustrated in FIG. 2 is an example, and some of the below described units may be integrated, and any configuration may be adopted as long as the configuration can realize the below described processing.

The information processing apparatus 101 includes an input unit 201, a display unit 202, a voice outputting unit 203, a distance specifying unit 204, a control unit 205, and a sight-line recognizing unit 206. The information processing apparatus 101 further includes a time specifying unit 207, a sight-line direction determination unit 208, a gaze velocity specifying unit 209 functioning as means for detecting a movement velocity of the gazed character, a scroll operation unit 210, a page transition unit 211, a current voice output character storage unit 212, and a gazed character specifying unit 213.

The input unit 201 detects a touch operation on the touch panel 102, and detects the voice output button 104 being pressed. For example, the input unit 201 specifies a flick operation of the user on the touch panel 102 (an operation in which the user slides his or her finger in any of the upward, downward, leftward and rightward directions while touching the touch panel).

The display unit 202 supplies the touch panel 102 with a picture (i.e., a screen of a page) signal based on picture signals supplied by the scroll operation unit 210 and the page transition unit 211. In the present embodiment, the touch panel 102 is supplied with a picture signal of a page of the electronic book that is specified by the scroll operation unit 210 and the page transition unit 211. Also, feedback information on the gazed character specified by the gazed character specifying unit 213 is displayed. For example, the gazed character is highlighted.

The voice outputting unit 203 sequentially supplies the speaker 103 with voice signals based on voice waveform data from a voice output starting character decided by the control unit 205.

The distance specifying unit 204 specifies a distance between a current voice output character that is specified by the current voice output character storage unit 212 and a gazed character that is specified by the gazed character specifying unit 213. The distance used in the present embodiment corresponds to the number of characters (the number of intermediate characters) between the gazed character and the current voice output character. The number of intermediate characters is obtained by counting the number of characters on the basis of SMIL information specifying the gazed character and SMIL information specifying the current voice output character. For example, if the third character from the beginning of the second line on the fifth page is the current voice output character, and the fifth character from the beginning of the second line on the fifth page is the gazed character, the number of intermediate characters will be counted as two. A description of a method for counting the number of characters is omitted since it is obvious.

The control unit 205 changes the character from which voice output is to be started (voice output starting character), on the basis of the results of the processing performed by the input unit 201, the distance specifying unit 204, the time specifying unit 207, the sight-line direction determination unit 208, the scroll operation unit 210, the page transition unit 211 and the like. The control unit 205 also changes the velocity at which voice is output, on the basis of the result of the processing performed by the gaze velocity specifying unit 209.

Figure 15A:
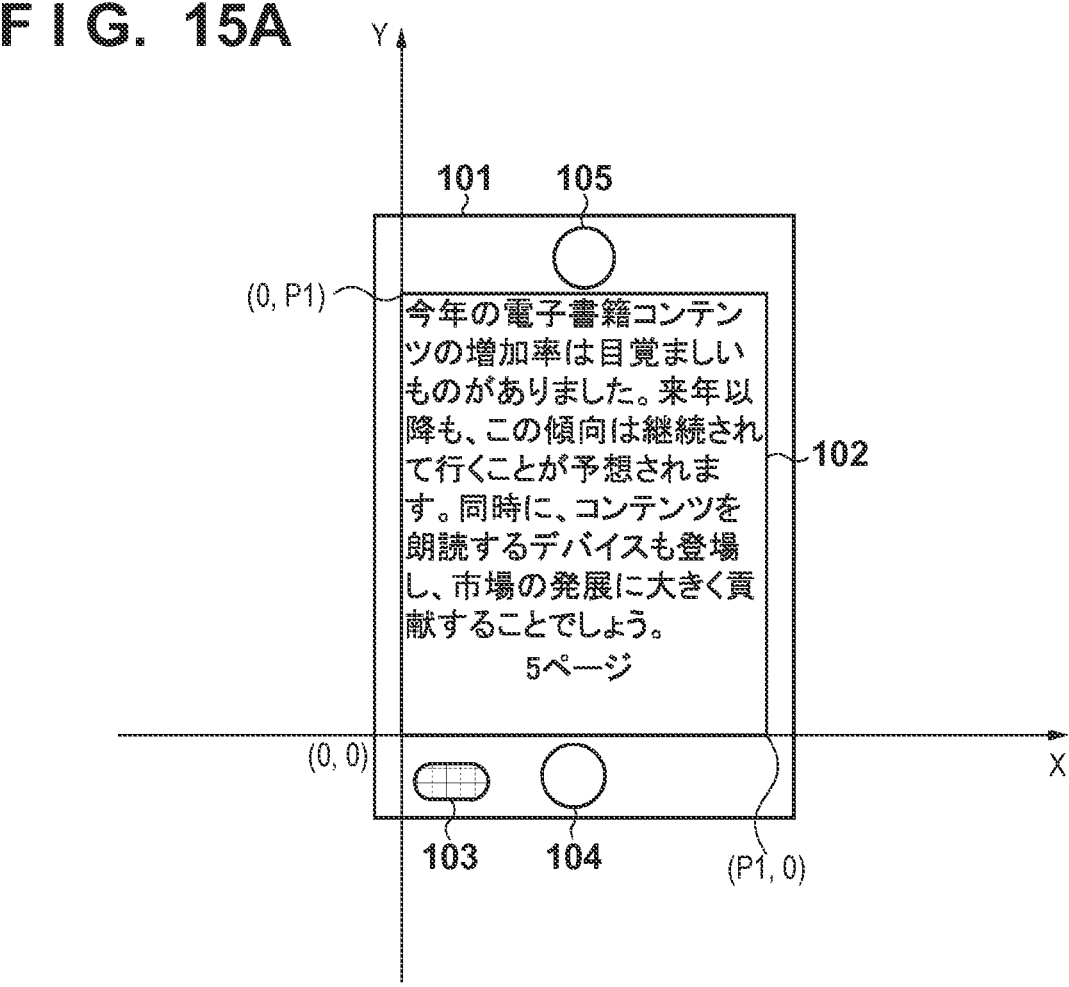
FIGS. 15A and 15B each illustrate X and Y axes that are set on the touch panel 102.
Figure 15B:
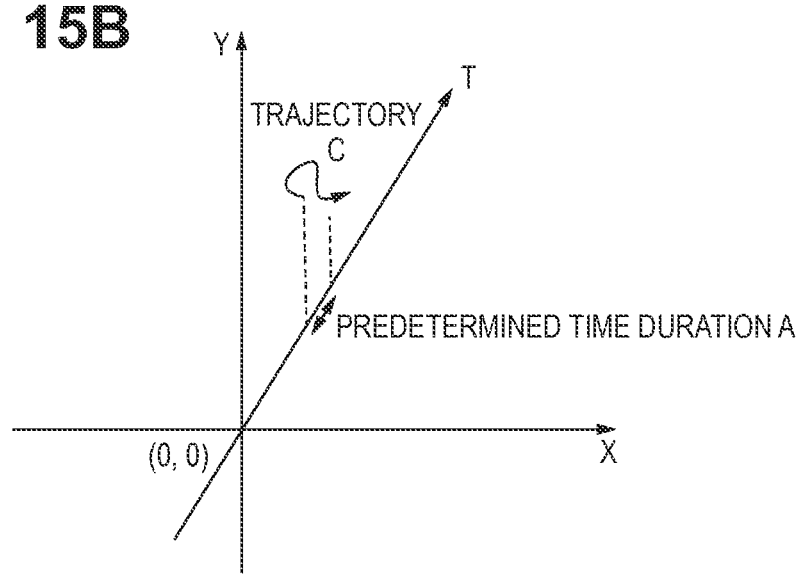
Figure 16:
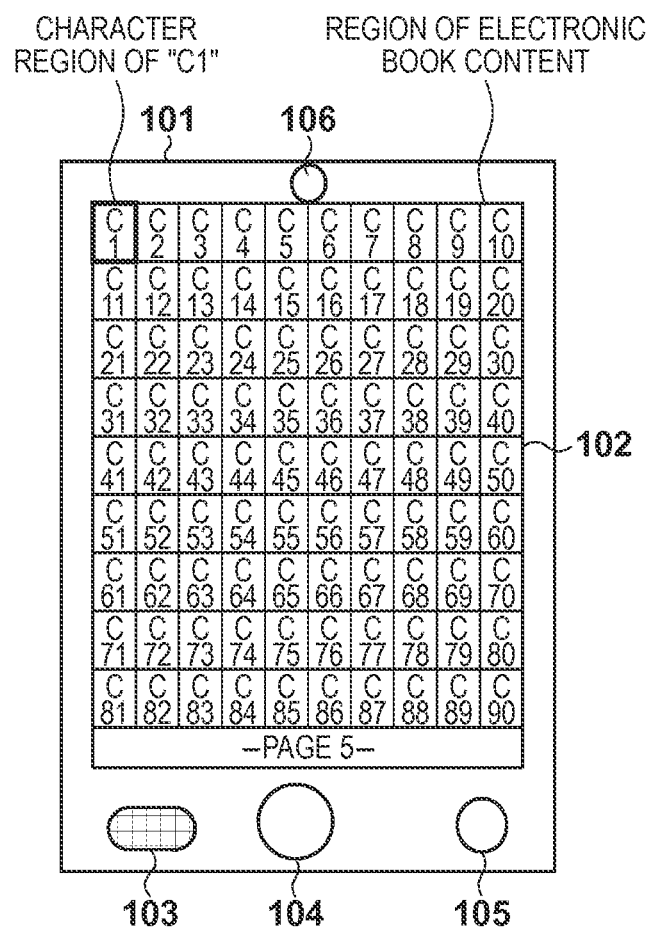
FIG. 16 is a diagram illustrating a region of an electronic book content and a character region.

The sight-line recognizing unit 206 specifies a sight-line position of the user based on the video captured by the camera 106. In the present embodiment, as shown in FIG. 15A, the lower left of the touch panel 102 is taken as the origin, the right direction is taken as an X axis, and the upward direction is taken as a Y axis. Note that although there is no actual plane except for the plane of the touch panel 102, it is assumed that an XY plane expands virtually. Coordinates of a centroid of the sight-line positions that move on the XY plane during a predetermined time duration A are assumed to be the gazed position. As shown in FIG. 15B, the coordinates of the centroid of a trajectory C drawn during the predetermined time duration will be the gazed position. Also, it is determined whether or not the sight-line position is present on the electronic book content on the touch panel 102. In the present embodiment, as shown in FIG. 16, a region of the electronic book content is defined, and it is determined whether or not the gazed position is present in this region. Note that reference numerals C1 to C90 in FIG. 16 indicate character regions displayed on the touch panel 102 in which individual characters are displayed.

The time specifying unit 207 resets a timer to 0 in response to the distance specified by the distance specifying unit 204 becoming a predetermined distance or more, and starts measuring time (disengagement time). Also, in the case where a current gazed character is not adjacent to the gazed character immediately therebefore (previously gazed character) in this order (in the case where the gazed character has not moved in the arrangement order of the characters), the timer is reset to 0 and measurement of time (continuous gaze time) is started.

The sight-line direction determination unit 208 counts the number of characters for which the gazed character moved in the arrangement order of the characters (the number of continuously gazed characters). If the number of continuously gazed characters is greater than or equal to a predetermined number of continuously gazed characters, it is determined that the gazed character has shifted in the arrangement order of the characters. Based on the number of continuously gazed characters counted by the sight-line direction determination unit 208, and the continuous gaze time measured by the time specifying unit 207, the gaze velocity specifying unit 209 specifies the velocity (gaze velocity) at which the gazed character has shifted.

The scroll operation unit 210 specifies, on the basis of the flick operation detected by the input unit 201, a display region to which the electronic book content that is displayed on the touch panel 102 is moved by scrolling. For example, if the input unit 201 detects a downward flick operation, a display region in the lower portion of the electronic book content currently displayed on the touch panel 102 will be specified as an object to be displayed on the touch panel 102. Accordingly, the scroll operation unit 210 supplies the display unit 202 with picture signals of the display regions of the electronic book content in the order of the scroll movement. The movement of the display region by scrolling is specified by the velocity of the flick operation and the contact time period during which a finger of the user is in contact with the touch panel 102.

The page transition unit 211 specifies, on the basis of the flick operation detected by the input unit 201, a page to be displayed on the touch panel 102. For example, if the input unit 201 detects the rightward flick operation, a page next to the page currently displayed on the touch panel 102 will be specified as an object to be displayed on the touch panel 102. Also, the page transition unit 211 supplies the display unit 202 with a picture signal of the specified page of the electronic book content. In the present embodiment, one flick operation shifts one page.

The current voice output character storage unit 212 refers to the SMIL description information and stores information for specifying a current voice output character (information on the page number, the line number, the character number from the beginning of the line), as the current voice output character, in a memory. For example, if the second character in the third line on the fifth page is the current voice output character, the page number "5", the line number "3", and the character number "2" from the beginning of the line are stored.

The gazed character specifying unit 213 specifies a gazed character to which the gazed position specified by the sight-line recognizing unit 206 belongs. In the present embodiment, one character region is defined for each character, and the character in the character region to which the gazed position belongs is specified as the gazed character. For example, as illustrated in FIG. 16, character regions with reference numerals C1 to C90 are defined, and if the gazed position is present in the character region in the upper left corner, the character in the character region C1 is defined as the gazed character. In the present embodiment, all the character regions on the same page, when combined, form the region of the electronic book content. The SMIL information and the character regions are associated with each other, so information for specifying a gazed character (information on the page number, the line number, and the character number from the beginning of the line) is specified. The specified gazed character is stored in the memory.

Figure 3:
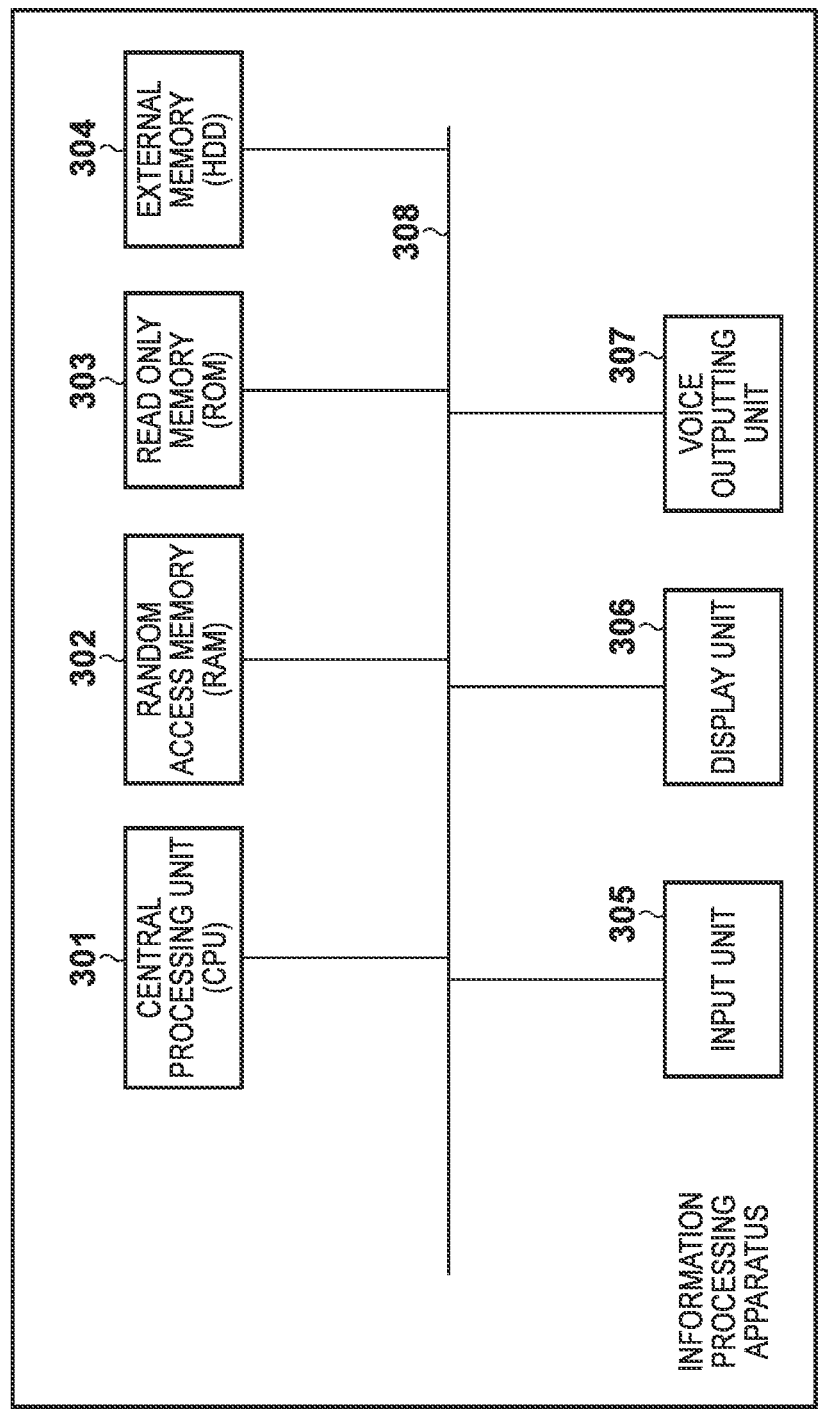
FIG. 3 is a diagram illustrating a hardware configuration of the information processing apparatus 101.

Every unit illustrated in FIG. 2 may be configured by hardware, but it is also possible that, for example, the current voice output character storage unit 212 is configured by a memory, and all or some of units other than the current voice output character storage unit 212 may be configured by software (a computer program). An example of the hardware configuration that is applicable to the information processing apparatus 101 in such a case will be described with reference to the block diagram of FIG. 3. A CPU 301 illustrated in the diagram performs overall control of operations of the computer with the use of a computer program and data that are stored in a RAM 302 and a ROM 303, and executes the processing that has been described above as being executed by the information processing apparatus 101. The RAM 302 includes an area for temporarily storing a computer program and data that are loaded from an external memory 304 such as a hard disk drive (HDD), and a work area used when the CPU 301 executes various types of processing. That is, the RAM 302 can suitably provide various types of areas. The ROM 303 has stored therein setting data of the computer, a boot program, and the like. The input unit 305 corresponds to the voice output button 104 and a touch sensor on the touch panel 102, and can input, as described above, various types of instructions into the CPU 301. The display unit 306 corresponds to the touch panel 102. The voice outputting unit 307 corresponds to the speaker 103. The external memory 304 has stored therein an operating system (OS), as well as computer programs and data for causing the CPU 301 to execute the various types of processing as described in the above embodiment. These computer programs include a computer program that corresponds to the units in FIG. 1 other than the current voice output character storage unit 212. Also, this data includes data on the electronic book content and the data that was described in the above processing as being well-known. The computer program and the data stored in the external memory 304 are suitably loaded in the RAM 302 in accordance with the control of the CPU 301 so as to be processed by the CPU 301. The above-described units are connected to a common bus 308. Note that the current voice output character storage unit 212 corresponds to the external memory 304 or the RAM 302. Also, the information processing apparatus including the functional configuration illustrated in FIG. 1 may be implemented by a single computer having the configuration illustrated in FIG. 3 or may be configured by a plurality of the devices. Note that some rather than all of the units illustrated in FIG. 1 may be configured by hardware/ software. Even in this case, this software is stored in the memory and executed by the CPU 301.

Next, processing performed by the information processing apparatus 101 according to the present embodiment will be described with reference to FIG. 4 that illustrates a flowchart of the processing. Note that in the following description, it is assumed that the Nth page (N≥1) (hereinafter referred to as page N) of the electronic book content is displayed on the touch panel 102, and voice has not yet been output for this Nth page. When the user presses the voice output button 104 in this state, the processing in steps S401 onward will be started.

In step S401, when the input unit 201 detects the voice output button 104 being pressed, the control unit 205 defines the first character on the page N as the voice output starting character. Accordingly, the voice outputting unit 203 generates, with respect to each of the characters from the first character onward on the page N, a voice signal based on the voice waveform data of the character, and supplies the speaker 103 with the generated voice signal. That is, in the present step, when the voice output instruction is input by the voice output button 104 being pressed, the page N displayed on the touch panel 102 at the time of the input is regarded as a voice output page, and voice that correspond to respective characters on the voice output page are sequentially output in the arrangement order of the characters.

In step S402, the current voice output character storage unit 212 stores information (the position of the gazed character on the displayed page) for specifying a character on the page N that is being output as voice by the voice outputting unit 203. That is, in the present step, the information for specifying a character on the voice output page that is being output as voice by the voice outputting unit 203 is managed in the memory (current voice output character storage unit 212).

In step S403, the sight-line recognizing unit 206 recognizes a sight-line position of the user on the basis of a video captured by the camera 106. Here, the recognition of a sight-line position starts at the time at which the processing of step S403 is started. The recognition of a sight-line position is performed only during the predetermined time duration A. When the predetermined time duration A has elapsed, coordinates of the centroid of the sight-line positions moved to during the predetermined time duration A are obtained. The obtained coordinates of the centroid are defined as the gazed position. After the predetermined time duration A has elapsed, the processing in step S404 is performed.

In step S404, the sight-line recognizing unit 206 determines whether or not the sight-line position recognized in step S403 is on the electronic book content on touch panel 102. If the sight-line position is on the electronic book content, the processing in step S405 is performed. If the sight-line position is not on the electronic book content, the processing returns to step S401.

When the processing advances to step S405, the sight-line recognizing unit 206 specifies the gazed position from the sight-line position recognized in step S403. The gazed character specifying unit 213 specifies a gazed character (a character that the user is gazing at) from the gazed position, and stores the specified gazed character in the memory (RAM). At this time, the display unit 202 highlights the specified gazed character. In the embodiments, the gazed character is highlighted in bold, but the gazed character may have a different color from that of the other characters, and any method (of highlighting) may be adopted.

In step S406, the distance specifying unit 204 specifies a number M of intermediate characters between the current voice output character and the gazed character.

In step S407, the control unit 205 determines whether or not the obtained number M of intermediate characters is greater than or equal to a predetermined number of intermediate characters. If the obtained number M of intermediate characters is greater than or equal to the predetermined number of intermediate characters, the processing advances to step S408. On the other hand, if the obtained number M of intermediate characters is not greater than or equal to the predetermined number of intermediate characters (less than the predetermined number), it may be considered that the user is reading the electronic book content while following the characters that are being output as voice, and thus that the processing returns to step S401.

In step S408, the voice outputting unit 203 stops the voice output. Then, in step S409, the control unit 205 specifies the gazed character stored in the memory as a voice output starting character. Then, the voice outputting unit 203 supplies the speaker 103 with voice signals based on voice waveform data from the specified voice output starting character, in the arrangement order of the characters.

Figure 5:
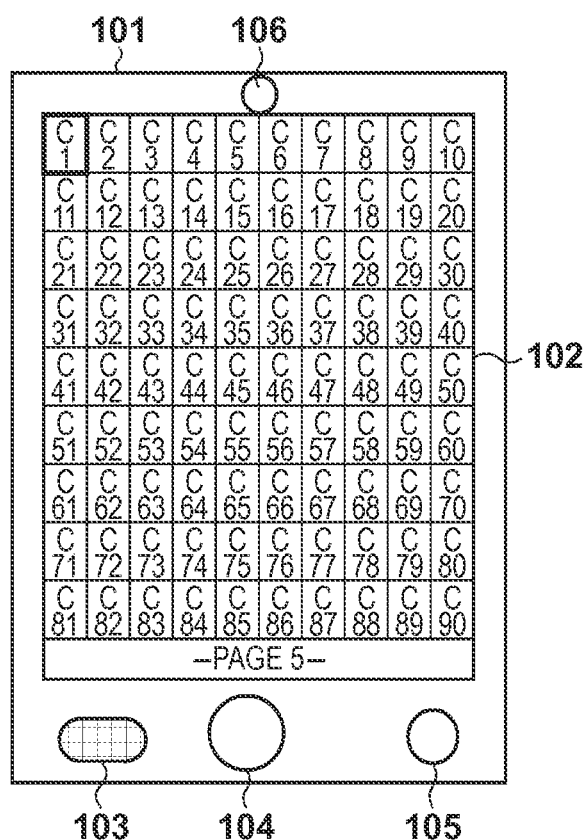
FIG. 5 is a diagram illustrating an example of display of a touch panel 102.

Hereinafter, a specific example in the case of N=5 is described. FIG. 5 illustrates an example of display of the page N on the touch panel 102.

In step S401, by collating the information stored in the current voice output character storage unit 212 with the SMIL description information, the voice outputting unit 203 outputs voice based on the voice waveform data of the characters in the order of the character in the character region C1, the character in the character region C2 onward.

An example of the structure of information to be registered at this time in step S402 in the current voice output character storage unit 212 is illustrated in FIG. 6A. As described above, since voice has not yet been output for the page 5, the page number "5" and the position of the first character on page 5 (the line number "1" and the character number "1" from the beginning of the line) are registered, as the current voice output character, in the current voice output character storage unit 212. At this time, if the user is gazing the character in the character region C1, the gazed character specifying unit 213 registers information illustrated in FIG. 7A in step S405 after having performed steps S403 and S404. Also, in step S405, the number M of intermediate characters is "0", and information illustrated in FIG. 8A is specified. If the voice output advances according to the arrangement order of the characters, the current voice output character is updated in synchronization therewith.

Then, it is assumed that when the character in the character region C14 that is the fourth character in the second line is being output as voice, the user gazes at the character in the first character region C31 in the fourth line. At this time, in step S402, the character is updated to the information illustrated in FIG. 6B. In step S405, the character is updated to the information illustrated in FIG. 7B. In step S406, the character is updated to the information illustrated in FIG. 8B. In step S407, since the number M of intermediate characters is 17, the number M of intermediate characters is determined to be the predetermined number of characters (for example, 15) or more, the predetermined number of characters serving as a first threshold. In step S408, the voice outputting unit 203 stops the voice output. In step S409, the control unit 205 changes the voice output starting character to the gazed character in the character region C31. Then, the voice outputting unit 203 outputs voice based on voice waveform data from the character in the character region C41, which is the changed voice output starting character.

As a result of the above (processing), as long as a distance between the position of character that is currently being gazed at (position of current gazed character) and the position of the current voice output character (position of current output character) is less than the predetermined first threshold, even if the position of a gazed character varies to some extent within the distance, it hardly influences the resulting sequence in which voice is output. If the distance is the threshold or more, voice output is started again from a gazed position of the user, thus enabling a natural voice reproduction that follows the gazed position.

Modification 1

Figure 14:
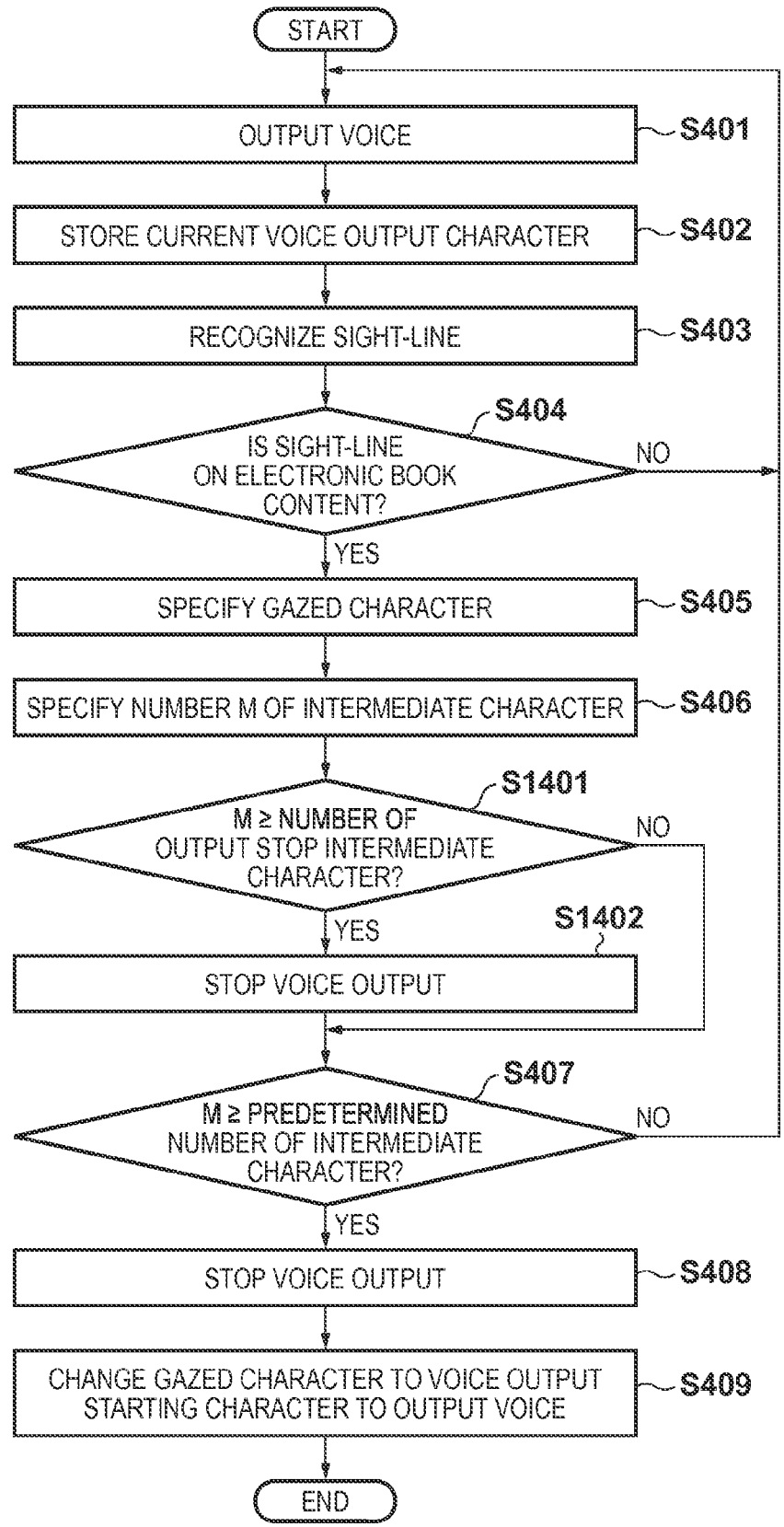
FIG. 14 is a flowchart illustrating processing performed by the information processing apparatus 101.

In the above-described embodiment, voice output is stopped if, in step S407, the number of intermediate characters has reached the first threshold or more. However, the present invention is not limited to this, and it is also possible that voice output is stopped before the number of intermediate characters reaches the first threshold or more. This modification is described with reference to the flowchart of FIG. 14. In FIG. 14, the same step numbers are added to the same processing steps as those in FIG. 4, and descriptions thereof are omitted. In the processing in the flowchart in FIG. 14, processing steps S1401 and S1402 are added.

In step S1401, the control unit 205 determines whether or not the number M of intermediate characters is greater than or equal to the number of output stop intermediate characters, which serves as a second threshold. If the number M of characters is greater than or equal to the number of output stop intermediate characters, the processing in step S1402 is performed. If the number M of characters is not greater than or equal to the number of output stop intermediate characters, the processing in step S407 is performed. Here, it is assumed that the relationship "second threshold<first threshold" is met. In step S1402, the voice outputting unit 203 stops the voice output.

As a result of the above processing, it is possible to stop the voice output if the number of intermediate characters reaches the second threshold or more before reaching the first threshold or more. Consequently, the user can stop the voice output while shifting the gazed character, and concentrate on determining the gazed character.

Modification 2

Figure 9:
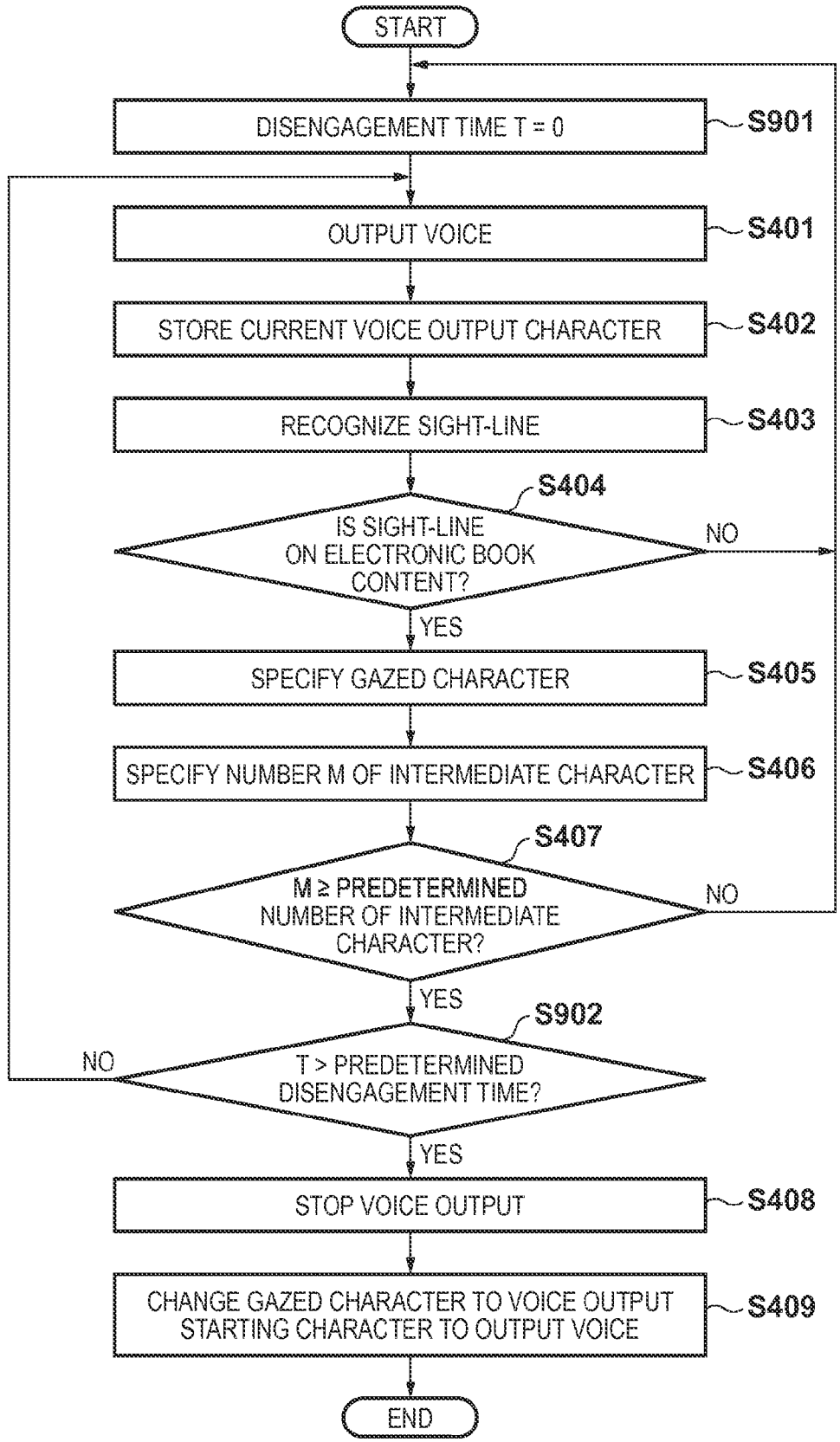
FIG. 9 is a flowchart illustrating processing performed by the information processing apparatus 101.

In the above description, the voice output starting character is changed depending on the number of intermediate characters. However, a problem occurs in that, if the user loses his or her concentration and the gazed character moves, resulting in the number of intermediate characters being greater than or equal to the predetermined number of intermediate characters, the voice output starting character is changed. In order to solve this problem, in the present modification 2, if the state in which a distance between the position of the current voice output character and the position of the current gazed character is the set threshold or more continues for a predetermined time duration or more, the voice output starting character is changed. Hereinafter, a description is made with reference to a flowchart in FIG. 9. Note that the following description is equivalent to the above description in that the Nth page (N≥1) (referred to as page N) of the electronic book content is displayed on the touch panel 102 and voice has not yet been output for this Nth page. In FIG. 9, the same step numbers are added to the same processing steps as those in FIG. 4, and descriptions thereof are omitted. In the processing of the flowchart in FIG. 9, processing steps S901 and S902 are added.

In step S901, the time specifying unit 207 start measuring time (disengagement time) (T=0). In step S902, the time specifying unit 207 determines whether or not the disengagement time T is a predetermined disengagement time (predetermined time) or more. If the disengagement time T is the predetermined disengagement time or more, the processing of step S409 is performed. If the disengagement time T is not the predetermined disengagement time or more, the processing of step S401 is performed. Note, however, that the relationship of "the predetermined time duration A<the predetermined disengagement time" is assumed to be met.

For example, it is assumed that when the character in the character region C14 is being output as voice, the user gazes at the character in the character region C32. At this time, in step S402, the character is updated to the information illustrated in FIG. 6C. In step S405, the character is updated to the information illustrated in FIG. 7C. In step S406, the character is updated to the information illustrated in FIG. 8C. In step S407, since the number M of intermediate characters is 18, the number M of intermediate characters is determined to be the predetermined number of intermediate characters (for example, 15) or more. At this time, in step S901, the measurement of the disengagement time T has started and T=0 (msec). Subsequently, it is assumed that the voice output advances in the arrangement order of the characters, and that when the character in the character region C30 is being output as voice, the user gazes at the character in the character region C73. At this time, in step S402, the character is updated to the information illustrated in FIG. 6D. In step S405, the character is updated to the information illustrated in FIG. 7D. In step S406, the character is updated to the information illustrated in FIG. 8D. In step S407, since the number M of intermediate characters is 43, the number M of intermediate characters is determined to be the predetermined number of intermediate characters (for example, 15) or more. However, it is assumed that when the gazed character shifts from the character region C30 to the character region C73, the gazed character is a character between the character in the character region 30 and the character in the character region 73. It is also assumed that, during the shift, the number M of intermediate characters is greater than or equal to the predetermined number of intermediate characters, and thus the measurement of the disengagement time T is not reset. At this time, in step S902, the disengagement time T is measured as T=3800 (msec), and is thus the predetermined disengagement time (for example, 4000 msec) or less. Also, in step S408, the voice outputting unit 203 stops the voice output. In step S409, the control unit 205 changes the voice output starting character to the gazed character in the character region C73. Accordingly, the voice outputting unit 203 outputs voice based on voice waveform data from the changed voice output starting character in the character region C73.

As described above, it is possible to change the voice output starting character if the disengagement time for which the number of intermediate characters is the predetermined interdistance number or more continues for the predetermined disengagement time or more. In other words, if the disengagement time is within the predetermined disengagement time, the voice output starting position is not changed and the previous voice output can be continued. Therefore, it is possible to prevent, in case where the user loses his or her concentration and the sight-line has moved, the voice output starting character from be changed.

Modification 3

In the above-described embodiments, the voice output starting character is changed depending on the number of intermediate characters and the disengagement time. However, the voice output starting position will be changed each time when the user skip-reads, causing an unnatural voice reproduction. In view of this, the present modification 3 will describe an example in which, if a position of a gazed character that the user is gazing at has moved continuously following the characters of the text by a predetermined number of characters or more, the user is considered to be reading the text with his or her eyes, and the voice output starting position is changed from the position of the character being read.

Figure 10A:
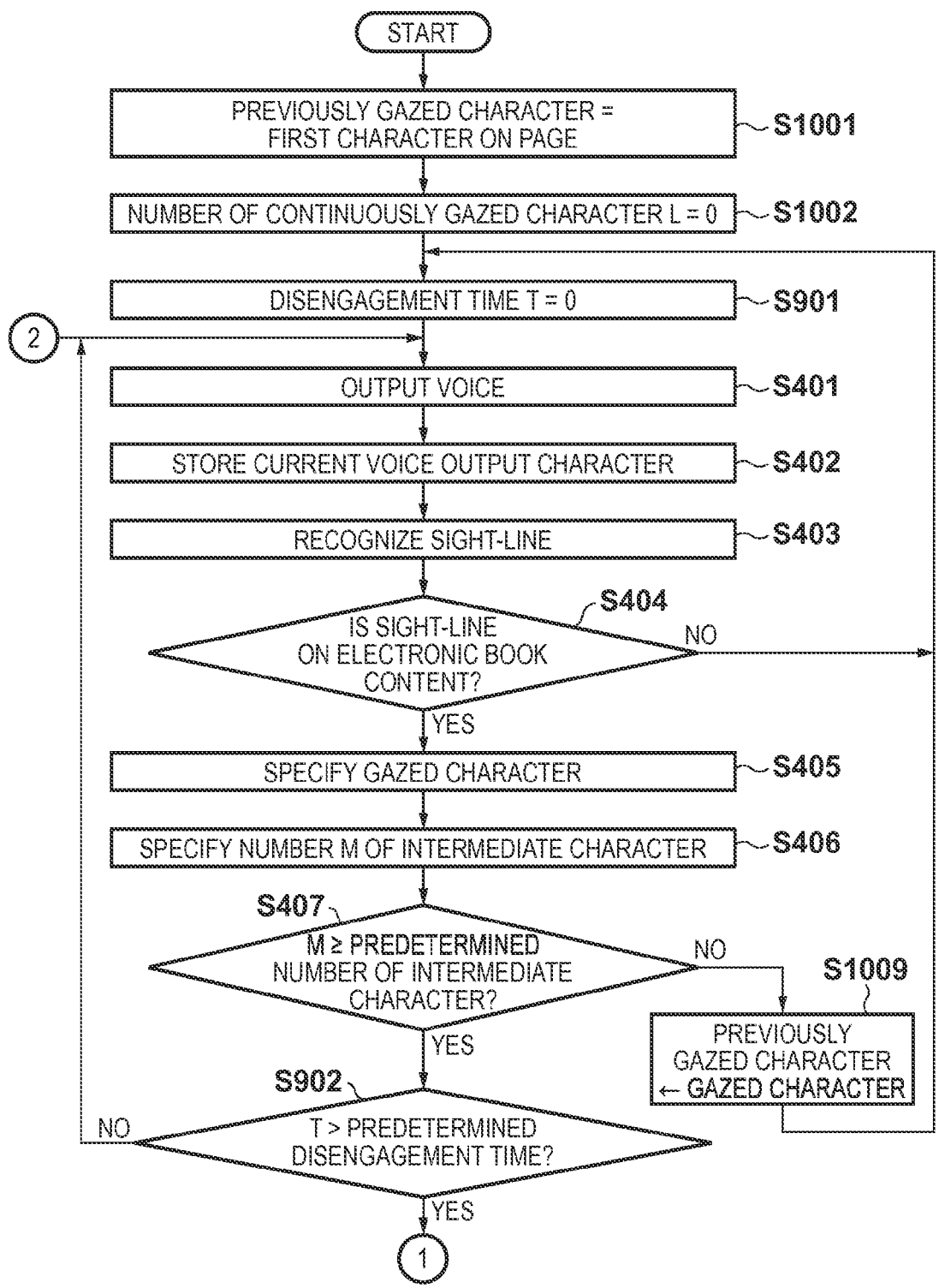

An example of the processing in this case is illustrated in the flowcharts of FIGS. 10A and 10B. Note that the following description is equivalent to the above description in that the Nth page (N≥1) (hereinafter referred to as page N) of the electronic book content is displayed on the touch panel 102, and voice has not yet been output for this Nth page. In FIGS. 10A and 10B, the same step numbers are added to the same processing steps as those in FIGS. 4 and 9, and descriptions thereof are omitted. Processing steps from S1001 to S1009 are added to the processing in the flowchart in FIG. 9.

In step S1001, the sight-line direction determination unit 208 sets the first character on the page N as the previously gazed character. In step S1002, the sight-line direction determination unit 208 starts counting a number L of continuously gazed characters (L=0). In step S1003, the previously gazed character is updated to the position of the current gazed character.

In step S1003, the sight-line direction determination unit 208 determines whether or not the previously gazed character is the same as the gazed character. If the previously gazed character is the same as the gazed character, the processing of step S401 is performed. If the previously gazed character is not the same as the gazed character, the processing of step S1004 is performed.

In step S1004, the sight-line direction determination unit 208 determines whether or not the next character after the previously gazed character is the same as the gazed character specified in step S405. If the next character after the previously gazed character is the same as the gazed character specified in step S405, the processing of step S1005 is performed. If the next character after the previously gazed character is not the same as the gazed character specified in step S405, the processing of step S1008 is performed. In step S1005, the sight-line direction determination unit 208 increments the number L of continuously gazed characters by one (L=L+1). This means that the continuous characters in the text are sequentially gazed one by one, and the number of characters is counted at this time. In step S1006, the sight-line direction determination unit 208 defines the previously gazed character as the gazed character specified in step S405.

In step S1007, the sight-line direction determination unit 208 determines whether or not the number L of continuously gazed characters is a predetermined number or more of continuously gazed characters. That is, it may be determined whether or not it is possible to consider that the user is sequentially reading a position that is distant from the current position of a voice output character by a threshold or more. If the number L of continuously gazed characters is the predetermined number or more of continuously gazed characters, the processing in the step S408 is performed. If the number L of continuously gazed characters is not the predetermined number or more of continuously gazed characters, the processing in the step S401 is performed.

In step S1008, the sight-line direction determination unit 208 resets the number L of continuously gazed characters (L=0). If, as a result of the processing in steps S1001 to S1008, the number L of continuously gazed characters is the predetermined number or more of continuously gazed characters, it is determined that the user has determined the gazed character and has started reading the electronic book content.

For example, similarly to modification 2, it is assumed that, in the example of display in FIG. 5, when the character in the character region C15 is being output as voice, the user gazes at the character in the character region C32. Then, it is assumed that the voice output advances in the arrangement order of the characters, and when the character in the character region 20 is being output as voice, the user gazes at the character in the character region C83. It is also assumed that, during this time, the number M of intermediate characters is greater than or equal to the predetermined number of intermediate characters, and the measurement of the disengagement time T is not reset. Also, it is assumed that immediately before the character in the character region C83 is gazed at, the characters in the character regions C78, C79, C80, C81, and C82 have been gazed at in this order. However, it is assumed that after the character in the character region C71 has been gazed at, the character in the character region C78 is gazed at. In this case, since in step S1003 the character in the character region C71 differs from the character in the character region C78, the processing of step S1004 is performed. In step S1004, since the previously gazed character of the character region 78 is not the character in the character region 71, the processing in step S1008 is performed. In step S1008, the number L of continuously gazed characters will be reset. Accordingly, at the time when the character in the character region 71 is gazed at, the count starts from the state in which the number L of continuously gazed characters was reset. By the processing in steps S1001 to S1006 and S1008, the number L of continuously gazed characters is counted as L=5. At this time, in step S1007, it is determined that the number L of continuously gazed characters is the predetermined number of continuously gazed characters (for example, 4) or more. In step S408, the voice outputting unit 203 stops the voice output. In step S409, the control unit 205 changes the voice output starting character to the gazed character in the character region C83. Also, the voice outputting unit 203 outputs voice based on voice waveform data from the changed voice output starting character in the character region C83.

As described above, it is possible to prevent the voice output starting character from being changed if, due to the user skip-reading, the disengagement time is the predetermined disengagement time or more before the gazed character is determined. It is possible to change the voice output starting character if the gazed character gazed at by the user is defined and the user is determined to have started reading the electronic book content (the gazed character has moved in the arrangement order of the characters).

Modification 4

Figure 11A:
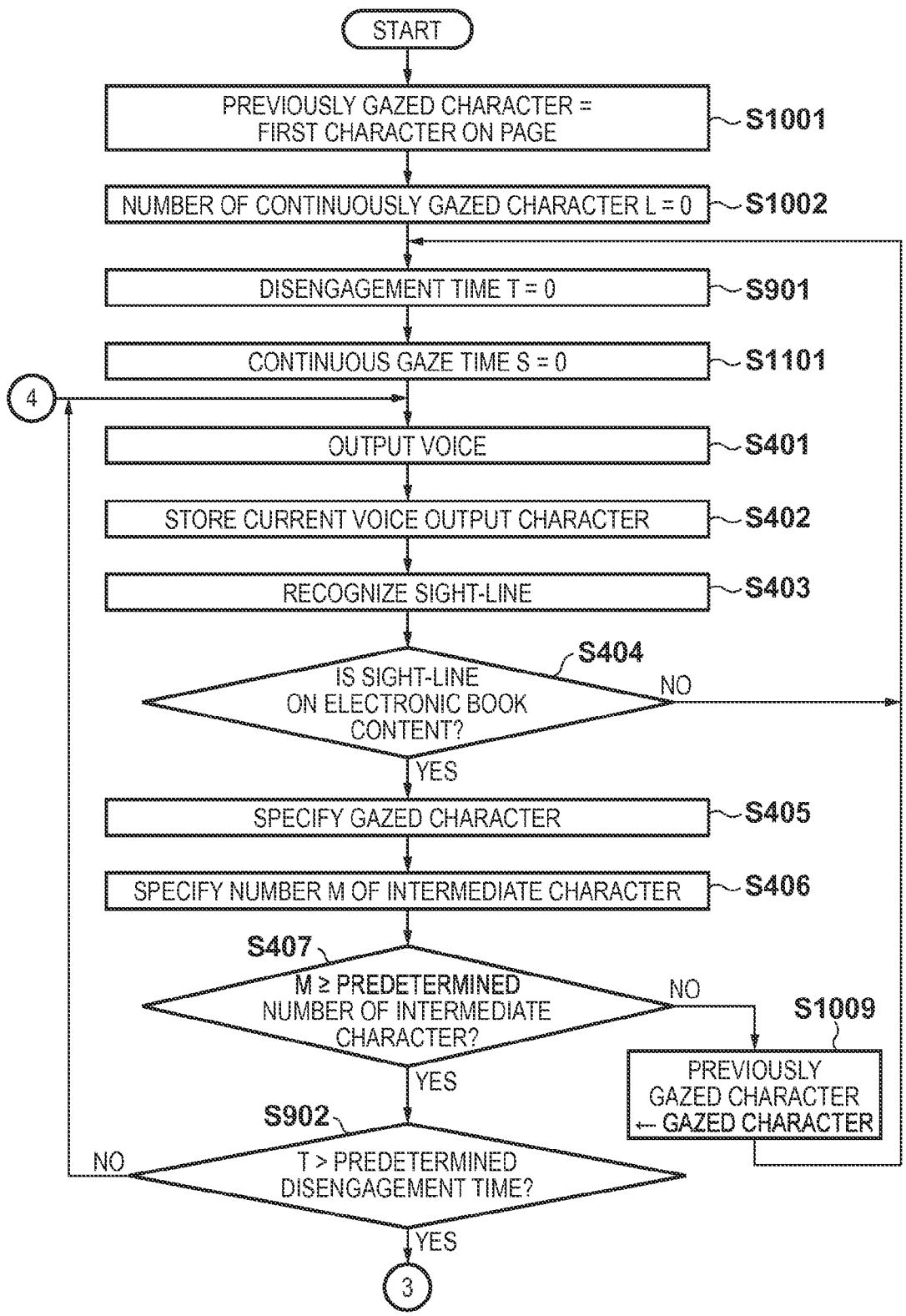
FIGS. 11A and 11B are flowcharts illustrating processing performed by the information processing apparatus 101.
Figure 11B:
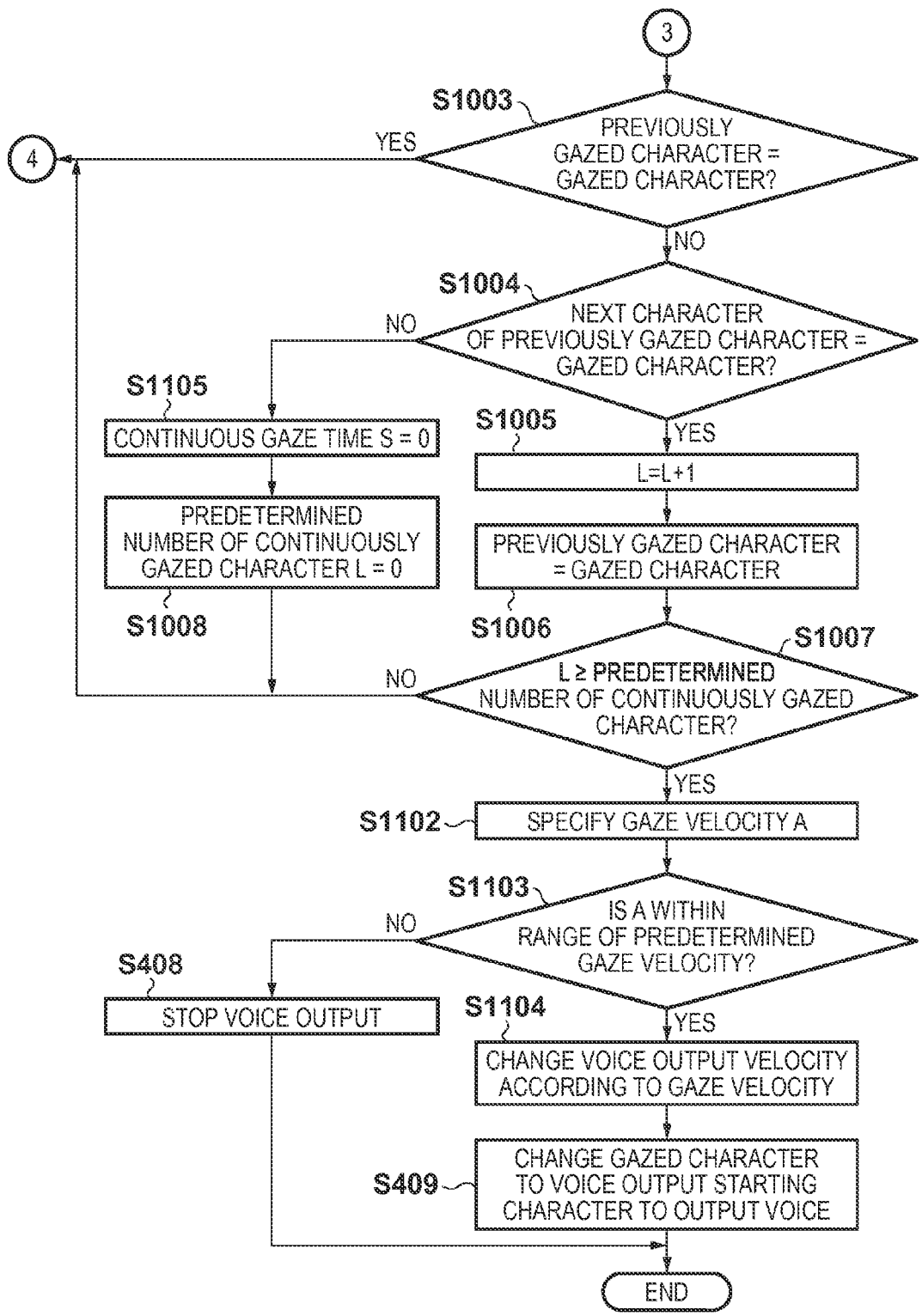

In the above-described embodiments, the voice output starting character is changed depending on the number of intermediate characters, the disengagement time, and the number of continuously gazed characters. However, if the voice output velocity differs from the gaze velocity after the change of the voice output starting character, voice output following the gazed characters is not performed. In order to solve this problem, in the present modification 4, a movement velocity at the position of a gazed character is detected, and a voice output velocity is set according to the detected movement velocity. Hereinafter, a description is given with reference to the flowcharts of FIGS. 11A and 11B. Note that the following description is equivalent to the above description in that the Nth page (N≥1) (hereinafter referred to as page N) of the electronic book content is displayed on the touch panel 102, and voice has not yet been output for this Nth page. In FIGS. 11A and 11B, the same step numbers are added to the same processing steps as those in FIGS. 4, 9, and 10, and descriptions thereof are omitted. Processing steps S1101 to S1105 are added to the processing in the flowchart of FIG. 9.

In step S1101, the time specifying unit 207 starts to measure a time (continuous gaze time) (S=0).

In step S1102, the gaze velocity specifying unit 209 specifies a gaze velocity A. In the present embodiment, the gaze velocity A is derived by the equation: gaze velocity A=number L of continuously gazed characters/continuous gaze time S. That is, the gaze velocity A is expressed by the number of characters output as voice per 1 msec. The gaze velocity immediately before the voice output starting character is changed will thus be obtained.

In step S1103, the gaze velocity specifying unit 209 determines whether or not the gaze velocity A is within a range of a predetermined gaze velocity (predetermined velocity). If the gaze velocity A is within the range, the processing of step S1104 is performed. If the gaze velocity A is not within the range, the processing of step S1105 is performed.

In step S1104, the control unit 205 sends to the voice outputting unit 203 instruction information to change the voice output velocity of the voice outputting unit 203 to the gaze velocity A. Then, the voice outputting unit 203 changes the voice output velocity in accordance with the instruction information.

In step S1105, the time specifying unit 207 resets the continuous gaze time S (S=0).

For example, similarly to modification 3, it is assumed that, on the screen in FIG. 5, when the character in the character region C15 is being output as voice, the user gazes at the character in the character region C32. Then, it is assumed that the voice output advances in the arrangement order of the characters, and when the character in the character region C30 is being output as voice, the user gazes at the character in the character region C83. It is also assumed that, during this time, the number M of intermediate characters is greater than or equal to the predetermined number of intermediate characters, and the measurement of the disengagement time T is not reset. Also, it is assumed that immediately before the character in the character region C83 is gazed at, the characters in the character regions C78, C79, C80, C81, and C82 have been gazed at in this order. However, after the character in the character region C71 has been gazed at, the gazing is performed from the character in the character region C78. In step S1003, since the character in the character region C71 differs from the character in the character region C78, the processing in step S1004 is performed. In step S1004, since the character region immediately before the character region C78 is not the character region C71, the processing in step S1105 is performed. In step S1105, the continuous gaze time S is reset. In step S1008, the number L of continuously gazed characters will be reset. Accordingly, at the time when the character region C78 is gazed at, the measurement and the counting are started from the state in which the continuous gaze time S and the number L of continuously gazed characters have been reset. By the processing in steps S1001 to S1006 and S1008, the number L of continuously gazed characters is counted as L=5. At this time, in step S1007, it is determined that the number L of continuously gazed characters is the predetermined number of continuously gazed characters (for example, 4) or more. Also, in step S1102, it is assumed that the continuous gaze time S is measured as S=1600. The gaze velocity A is obtained by the gaze velocity A=4/1400=0.0025. Then, in step S408, the voice outputting unit 203 stops the voice output. In step S409, the control unit 205 changes the voice output starting character to the gazed character in the character region C83. Also, the control unit 205 changes the voice output velocity to 0.0025. Also, the voice outputting unit 203 outputs voice based on voice waveform data from the changed voice output starting character in the character region C83.

As a result of the description above, the voice output velocity differs from the gaze velocity after the change of the voice output starting character, enabling the failure of voice output following the gazed characters to be prevented. The voice output is performed at the gaze velocity immediately before the change of the voice output starting character. Also, it is possible to stop the voice output when the gaze velocity immediately before the change is beyond the range of the predetermined gaze velocity. For example, in the case where the voice output velocity is too fast for the user to be audible, it is possible to stop the voice output.

Figure 18A:
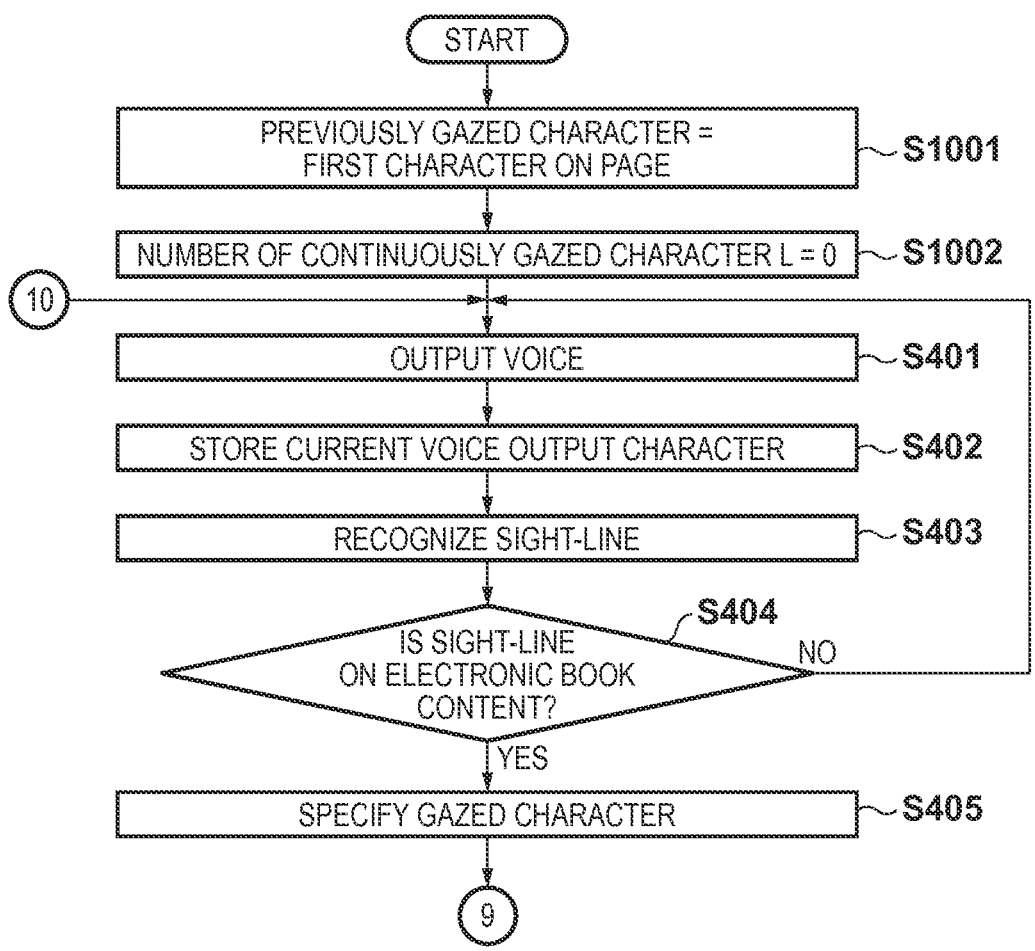
FIGS. 18A and 18B are flowcharts illustrating processing performed by the information processing apparatus 101.
Figure 18B:
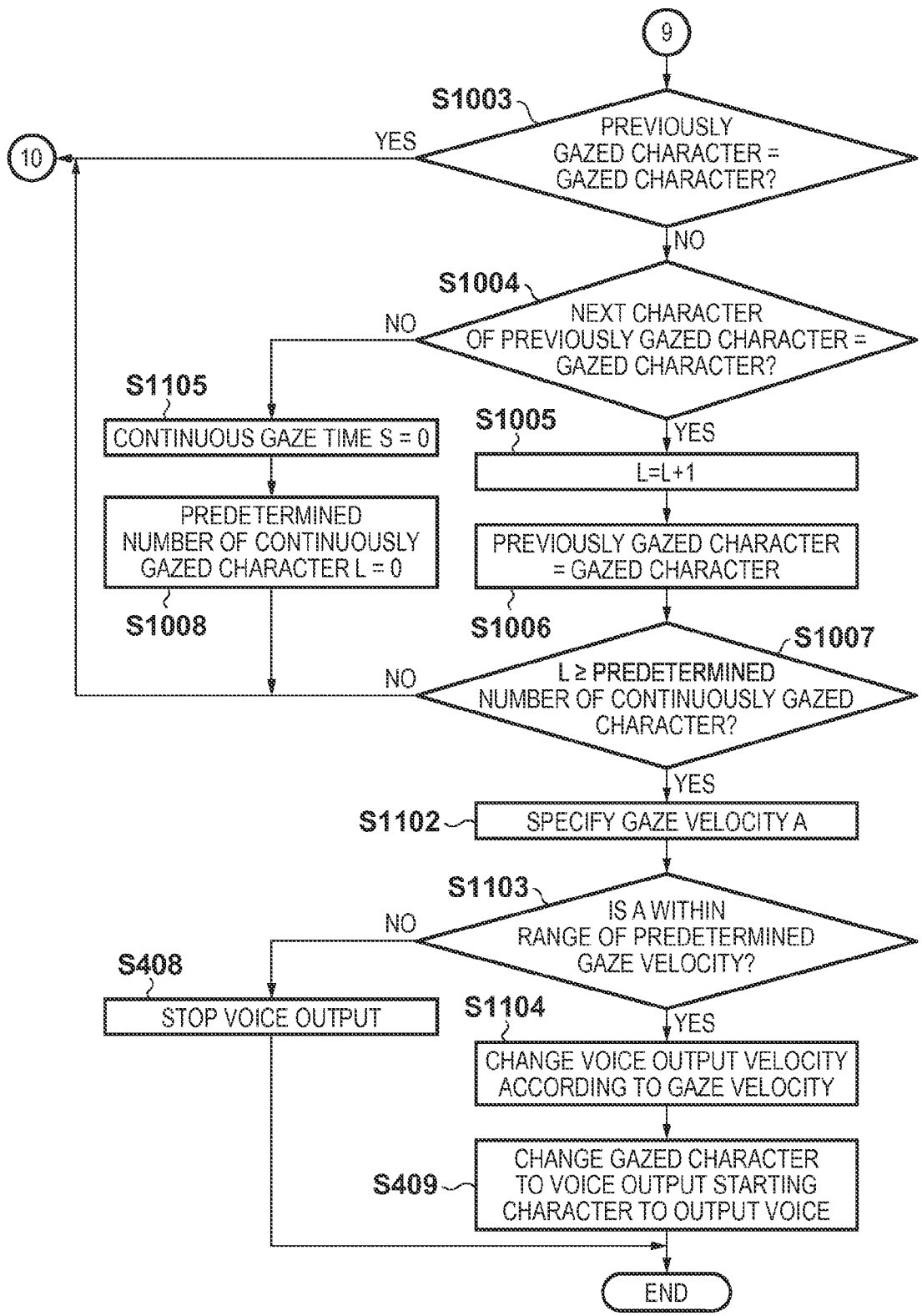

Here, in the processing of the flowcharts in FIGS. 11A and 11B, the voice output starting character is changed depending on the number of intermediate characters and the disengagement time. However, the present invention is not limited to this and, as in the flowcharts of FIGS. 18A and 18B, the voice output velocity and the voice output starting character may be changed without waiting for an increase in the number of intermediate characters and the elapse of the disengagement time. Note that the following description is equivalent to the above description in that the Nth page (N≥1) (hereinafter referred to as a page N) of the electronic book content is displayed on the touch panel 102, and voice is not yet output for this Nth page. In FIGS. 18A and 18B, the same step numbers are added to the same processing steps as those in FIGS. 4, 9, 10, and 11, and descriptions thereof are omitted. FIGS. 18A and 18B differ from FIGS. 11A and 11B in that the processing steps S901, S902, S406, and S407 are not performed.

However, when in step S409 the voice output starting character is changed to the gazed character, the voice output starting character may be changed to the character that precedes the gazed character by the predetermined number of characters. For example, if the character in the character region C11 is the gazed character, the voice output may be started from the character in the character region C15, which precedes the character region C11 by four characters.

That is, the voice output velocity and the voice output starting character are changed without waiting for an increase in the number of intermediate characters and the elapse of the disengagement time. For the user, the voice output starting character and the voice output velocity are changed in real time in line with the gazed character.

Modification 5

Figure 13A:
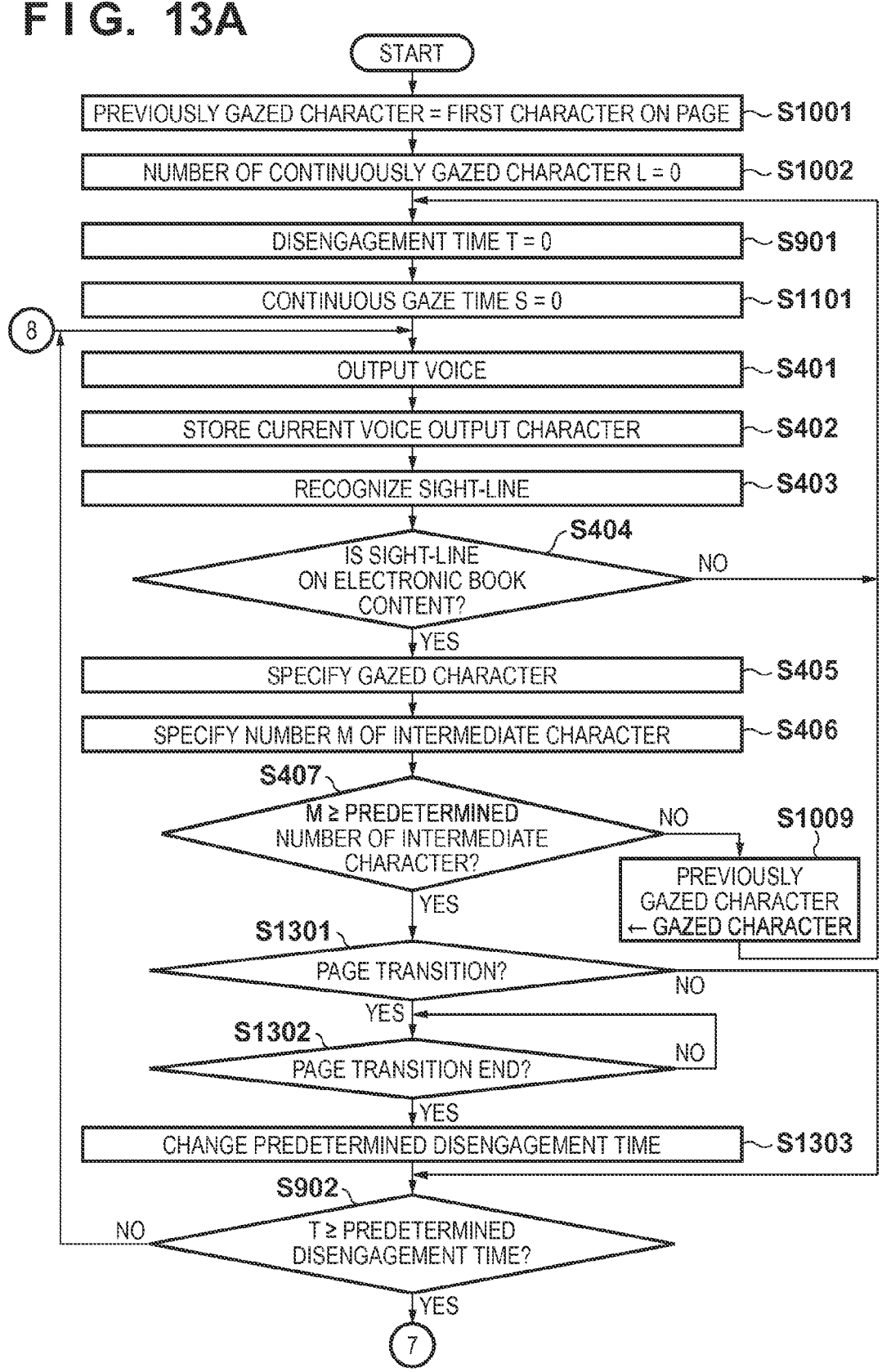
FIGS. 13A and 13B are flowcharts illustrating processing performed by the information processing apparatus 101.
Figure 13B:
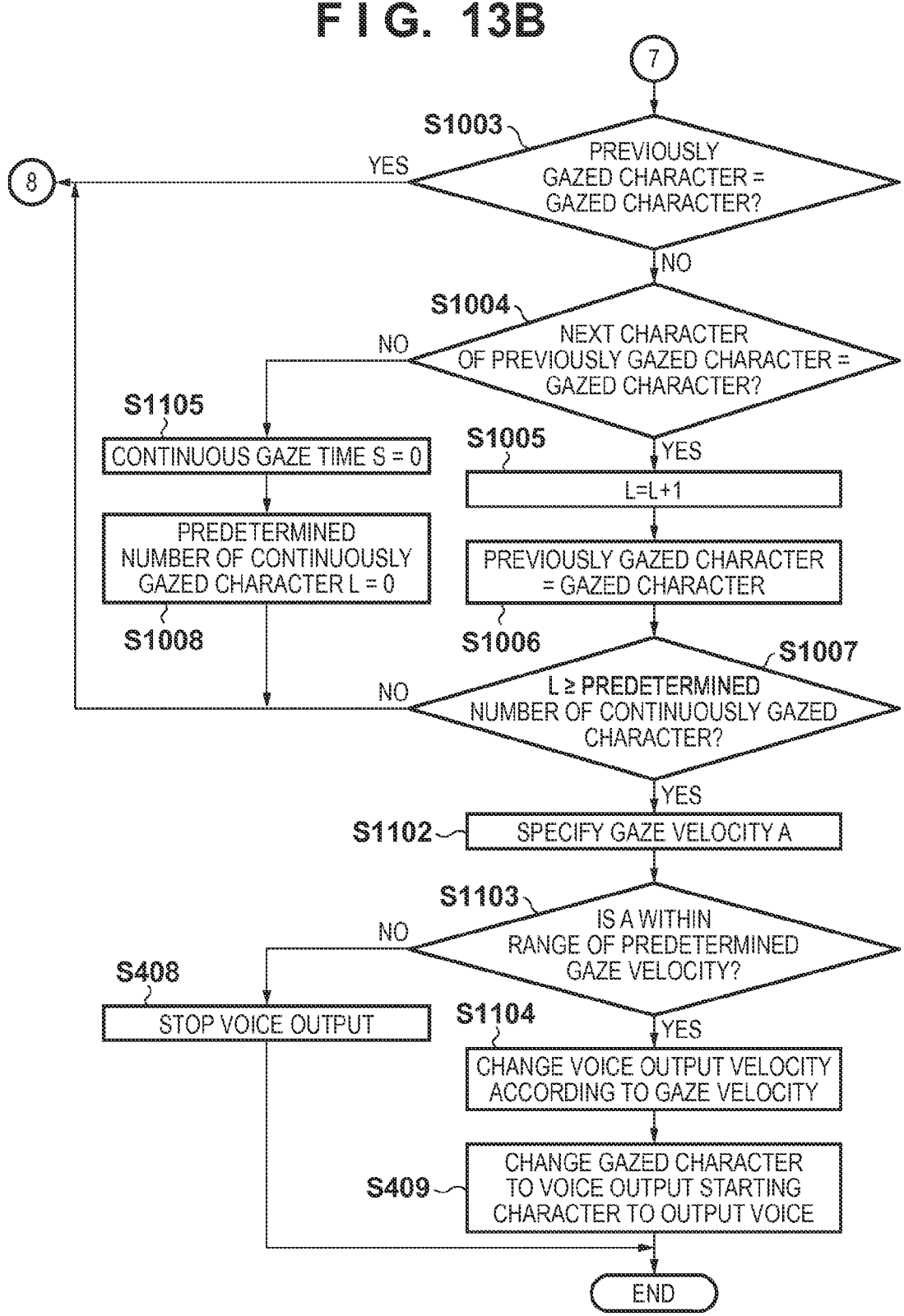

Hereinafter, a modification in the case where a page transition instruction to the touch panel 102 has been detected is described with reference to the flowcharts of FIGS. 13A and 13B. Note that the following description is equivalent to the above description in that the Nth page (N≥1) (hereinafter referred to as page N) of the electronic book content is displayed on the touch panel 102, and voice has not yet been output for this Nth page. In FIGS. 13A and 13B, the same step numbers are added to the same processing steps as those in FIGS. 4, 9, 10, and 11, and descriptions thereof are omitted. Processing steps from steps S1301 to S1303 are added to the processing in the flowchart in FIGS. 4, 9, 10, and 11.

In step S1301, if the page transition unit 211 has detected a leftward or rightward flick operation on the input unit 201, the page transition unit 211 specifies the page to be displayed on the touch panel 102 and sequentially supplies the display unit 202 with picture signals of the specified page. If the flick operation was detected, the processing in step S1302 is performed. If the flick operation was not detected, the processing in step S902 is performed.

In step S1302, the page transition unit 211 determines whether or not the leftward or rightward flick operation was detected in a predetermined time period. If the flick operation was detected, the page transition unit 211 specifies the page to be displayed on the touch panel 102 and sequentially supplies the display unit 202 with the picture signals of the specified page. Then, the processing in step S1302 is performed. If it is determined that the page transition was completed without the flick operation having been detected, the processing in step S1303 is performed.

In step S1303, the control unit 205 changes the time duration. That is, the control unit 205 changes the predetermined disengagement time. For example, the predetermined disengagement time is changed from 3000 msec to 2000 msec.

When the page is shifted, the user is very likely to change the gazed character. Accordingly, when a scroll operation is performed, the voice output starting character may be changed depending on the number of continuously gazed characters and the continuous gaze time, without waiting for the elapse of the disengagement time. That is, in FIGS. 13A and 13B, when the page is shifted, it is possible to disregard the elapse of the disengagement time by lowering the predetermined disengagement time.

Note that in step S1303 in the case where the page transition was confirmed, if the page before the transition differs from the page after the transition, it is also possible to unconditionally set the voice output starting position to be the beginning of the page.

Modification 6

Figure 12A:
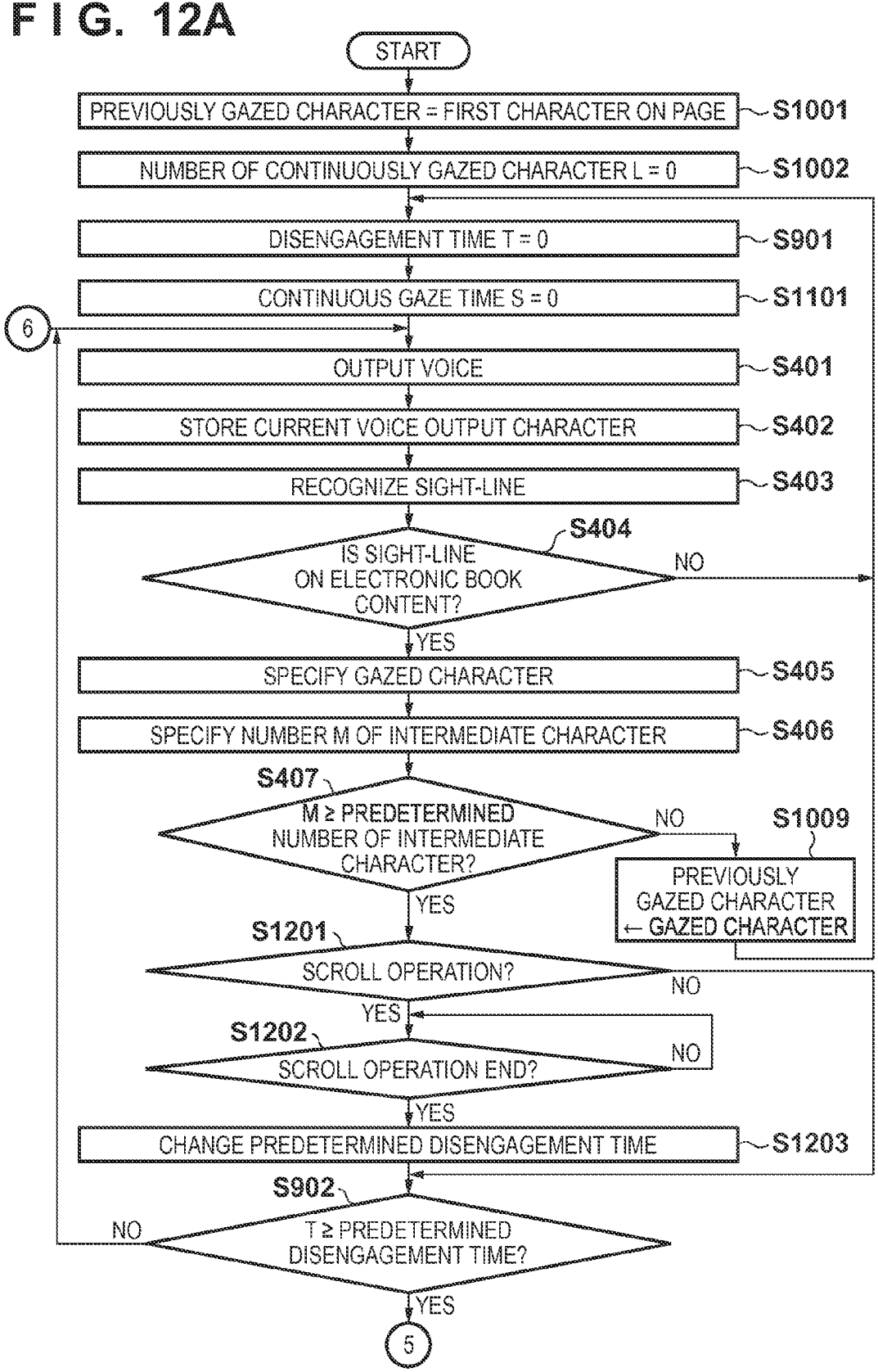
FIGS. 12A and 12B are flowcharts illustrating processing performed by the information processing apparatus 101.
Figure 12B:
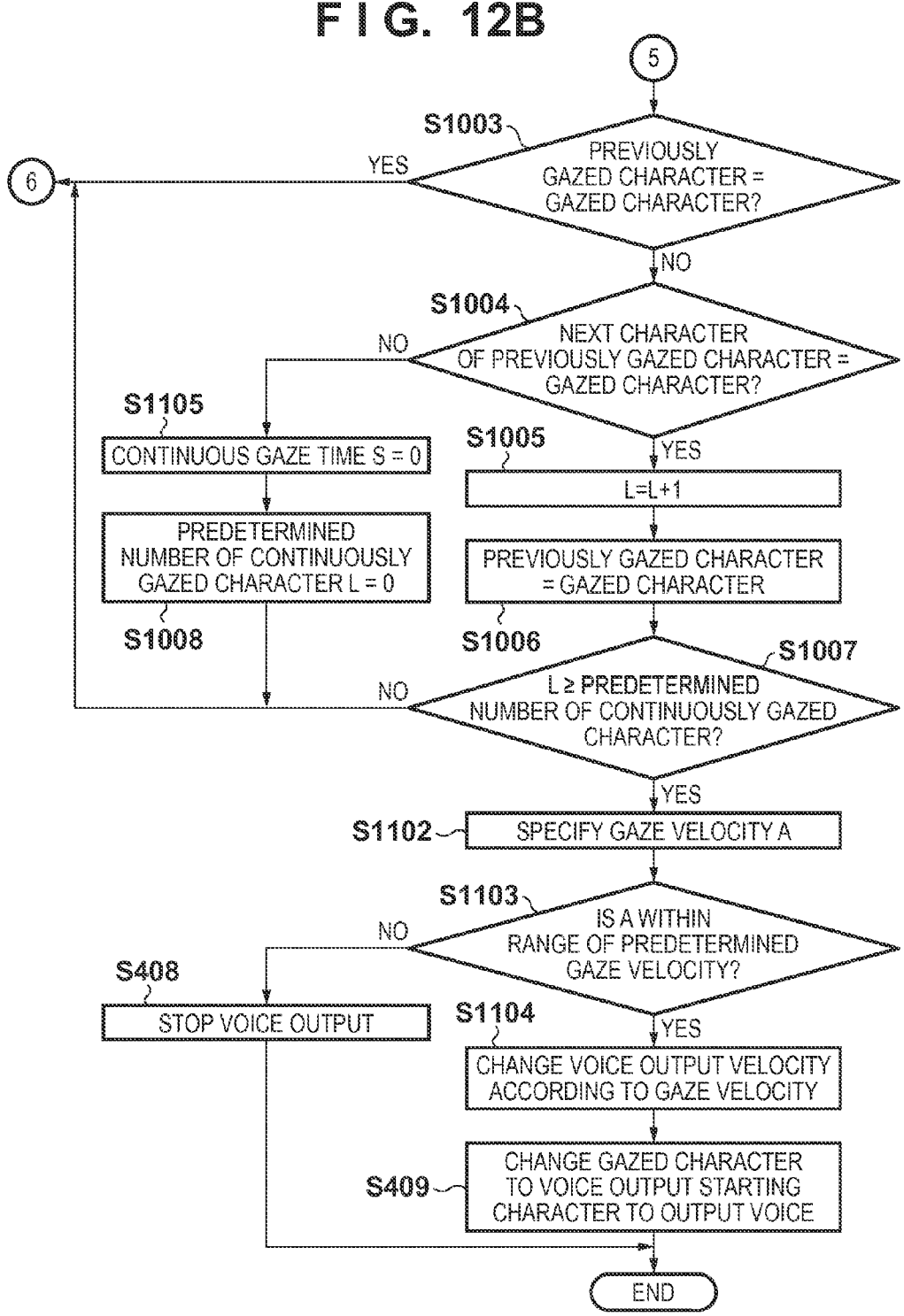

Hereinafter, a modification in the case where a scroll instruction to the touch panel 102 has been detected is described with reference to the flowcharts of FIGS. 12A and 12B. Note that the following description is equivalent to the above description in that the Nth page (N≥1) (hereinafter referred to as a page N) of the electronic book content is displayed on the touch panel 102, and voice has not yet been output for this Nth page. In FIGS. 12A and 12B, the same step numbers are added to the same processing steps as those in FIGS. 4, 9, 10, and 11, and descriptions thereof are omitted. Processing steps from S1201 to S1203 are added to the processing in the flowcharts in FIGS. 4, 9, 10, and 11.

In step S1201, if the scroll operation unit 210 has detected an upward or leftward flick operation on the input unit 201, the scroll operation unit 210 sequentially specifies the page to be displayed on the touch panel 102 and supplies the display unit 202 with picture signals of the specified page. If the flick operation was detected, the processing in step S1202 is performed. If the flick operation was not detected, the processing in step S902 is performed.

In step S1202, the page transition unit 211 determines whether or not to the leftward or rightward flick operation was detected in a predetermined time period. If the flick operation was detected, the page transition unit 211 specifies the display region to be displayed on the touch panel 102 and supplies the display unit 202 with picture signals of the specified display region in the order of the scrolling movement. Then the processing in step S1202 is performed. If it is determined that the page transition was completed without the flick operation having been detected, the processing in step S1203 is performed.

In step S1203, the control unit 205 changes the predetermined disengagement time. For example, the predetermined disengagement time is changed from 3000 msec to 2000 msec.

When a scroll operation is performed, the user is very likely to change the gazed character. Accordingly, when a scroll operation is performed, the voice output starting character may be changed depending on the number of continuously gazed characters and the continuous gaze time without waiting for the elapse of the disengagement time. That is, in FIGS. 12A and 12B, when a scroll operation is performed, it is possible to disregard the elapse of the disengagement time by lowering the predetermined disengagement time.

Modification 7

Figure 17:
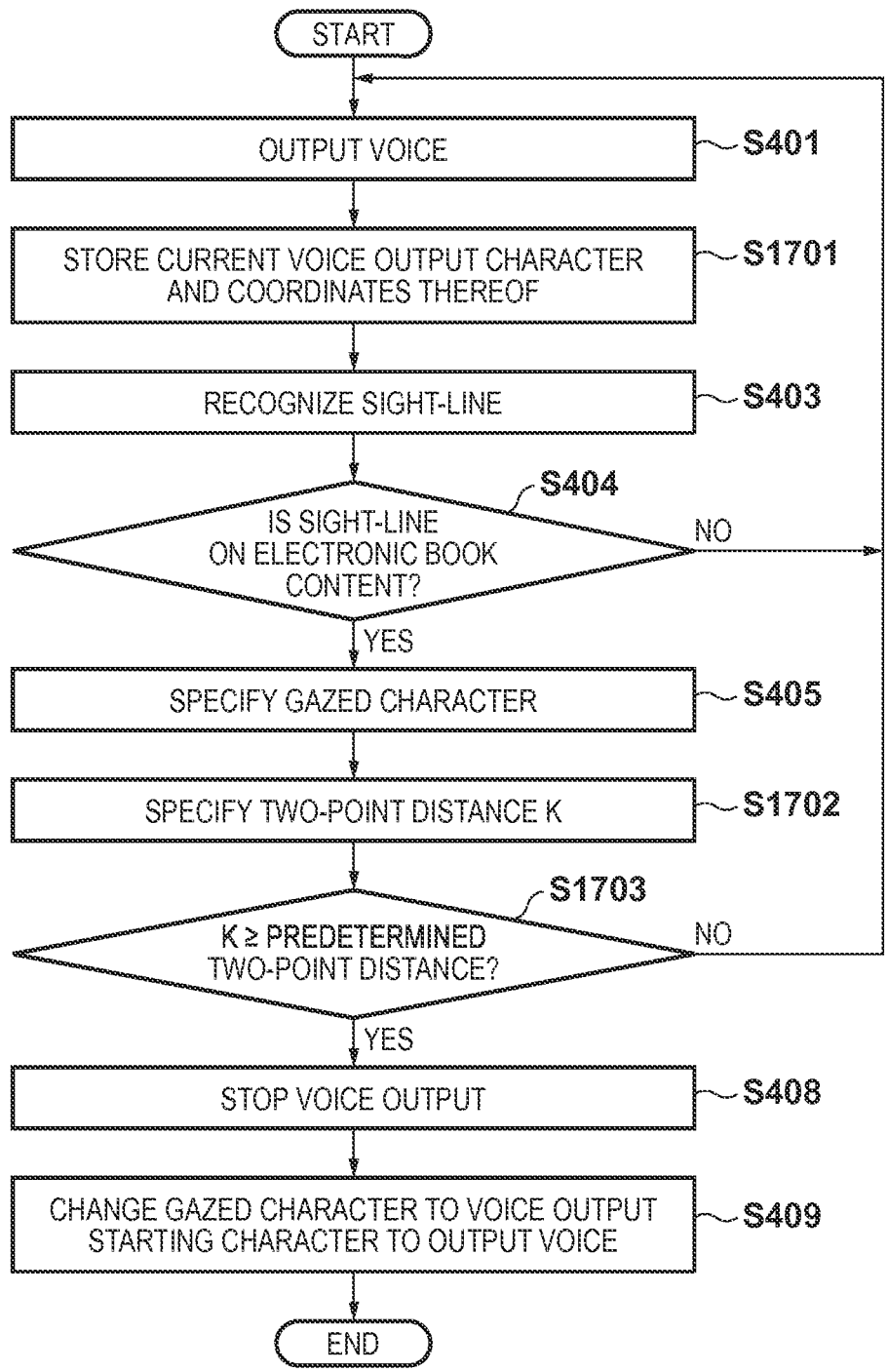
FIG. 17 is a flowchart illustrating processing performed by the information processing apparatus 101.

As described above, in FIG. 4, the voice output starting character is changed depending on the number of intermediate characters (a distance in the arrangement order of the characters in the character string as text), but the present invention is not limited to this. It is also possible to change the voice output starting character depending on a distance on the screen within the two-dimensional space (two-point distance) between the current voice output character and the gazed position. A modification for use in this case will be described with reference to the flowchart of FIG. 17. Note that the following description is equivalent to the above description in that the Nth page (N≥1) (hereinafter referred to as a page N) of the electronic book content is displayed on the touch panel 102, and voice has not yet been output for this Nth page. In FIG. 17, the same step numbers are added to the same processing steps as those in FIG. 4, and descriptions thereof are omitted. The processing steps S402, S406, and S407 are replaced by processing steps S1701 to S1703.

Figure 4:
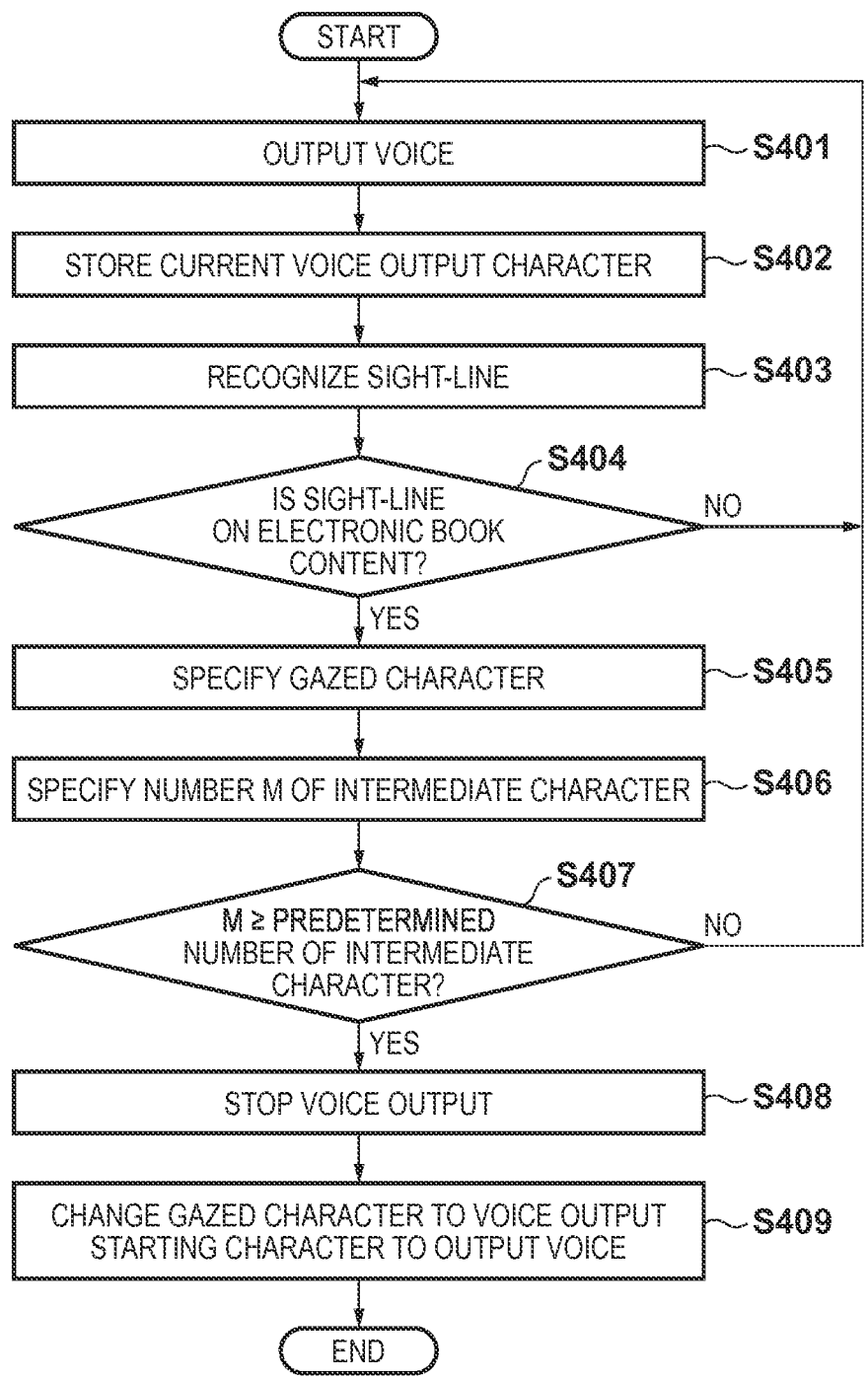
FIG. 4 is a flowchart illustrating processing performed by the information processing apparatus 101.

In step S1701, the current voice output character storage unit 212 first executes similar processing to that in step S402 in FIG. 4. At the same time, the current voice output character storage unit 212 stores coordinates of the current voice output character (current voice output coordinates). In the present embodiment, the current voice output coordinates are defined as the center point of the character region.

In step S1702, the distance specifying unit 204 specifies a distance (two-point distance K) between the current voice output coordinates and the coordinates of the gazed position. Methods for specifying a two-point distance are well known and descriptions thereof are omitted here.

In step S1703, the control unit 205 determines whether or not the two-point distance K is a predetermined two-point distance or more. If the distance K is the predetermined two-point distance or more, the processing in step S408 is performed. If the distance K is not the predetermined two-point distance or more, the processing in step S401 is performed.

Here, although, in step S401 according to the present embodiment, the voice output is performed from the beginning of the page, the present embodiment is not limited to this. By designating a voice output starting character with a touch operation and then pressing the voice output button 104, the voice output may be performed from the designated voice output starting character. Also, although voice is output based on the voice waveform data in which the electronic book content is read aloud, voice may be output such that the electronic book content is read using a voice synthesis technology. However, in the use of the voice synthesis technology, in step S407, the control unit 205 that controls the voice output position supplies the speaker 103 with voice signals based on the voice waveform data of the characters arranged after the voice output starting character. For example, it is assumed that the character region C20 is the voice output starting character. If the character region C20 is not the beginning but the middle of a significant word, the user will likely feel that the output text is unnatural. Accordingly, if the character region C20 is the voice output starting character, voice output is performed, using voice synthesis, from the beginning character of the text or a delimiter in the middle of the text that is located near the voice output starting character. For example, if the voice output starting character is the character in the character region C20, the voice output is performed from the beginning of the word including this character. The voice synthesis technology is well known, and thus a description thereof is omitted.

Other Embodiments

Although in the above-described embodiments, control over the voice output of text has been described, voice output may be controlled with respect to contents including images and icons, instead of text. In this case, voice may be associated with image data, icon button and the like, instead of a character.

Also, although the embodiments have been described, taking the case in which an electronic book to be displayed having Japanese text as an example, the present invention is not limited to this. For example, when the present invention is applied to English, processing may be performed such that the position at which the user is gazing is a character region but the position of the voice output character is located in the center of a character string that constitutes a word.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-156925, filed Jul. 12, 2012 which is hereby incorporated by reference herein in its entirety.

What is claimed is:

1. An electronic device comprising:
   a display unit configured to display text on a screen;
   a voice outputting unit configured to output the text as voice;
   a sight-line detection unit configured to detect a sight-line direction of a user; and
   a control unit configured, assuming that a position of a character that the voice outputting unit is currently outputting as voice is defined as a position of a current output character, and a position of a character in the text that is present in the sight-line direction of the user detected by the sight-line detection unit is defined as a position of a current gazed character, to change a starting position at which the voice outputting unit starts voice output depending on a distance between the position of the current output character and the position of the current gazed character,
   the control unit including:
   a determination unit configured to determine whether or not the distance between the position of the current output character and the position of the current gazed character is equal to a preset threshold or more; and
   a setting unit configured, if the determination unit determined that the distance is equal to the preset threshold or more, to set the position of the current gazed character to the starting position at which the voice outputting unit starts voice output.

2. The device according to claim 1,
   wherein assuming that the preset threshold is defined as a first threshold, and a threshold that is less than the first threshold is defined as a second threshold,
   the control unit is configured, if the distance is equal to the second threshold or more and less than the first threshold, to control the voice outputting unit to stop the voice output.

3. The device according to claim 1,
   wherein the setting unit is configured, if a state in which the distance is equal to the preset threshold or more continues for a predetermined time duration or more, to set the position of the current gazed character to the starting position at which the voice outputting unit starts voice output.

4. The device according to claim 1,
   wherein the setting unit is configured, on the further condition that a position of the gazed character present in the sight-line direction detected by the sight-line detection unit has shifted along the characters of the text in succession by a predetermined number of characters or more, to set the position of the current gazed character to the starting position at which the voice outputting unit starts voice output.

5. The device according to claim 1,
   wherein the control unit further includes a velocity detection unit configured to detect a velocity at which the position of the gazed character present in the sight-line direction detected by the sight-line detection unit shifts, and
   the setting unit is configured to set the position of the current gazed character to the starting position at which the voice outputting unit starts voice output, and to set a voice output velocity according to the velocity detected by the velocity detection unit.

6. The device according to claim 3,
   wherein the control unit includes a time duration change unit configured to change the predetermined time duration if page transition or page scroll with respect to the text displayed on the screen is instructed.

7. The electronic device according to claim 1,
   wherein the distance used for the determination by the determination unit is the number of characters in an arrangement of a character string in the text, between the position of the current output character and the position of the current gazed character.

8. The device according to claim 1,
   wherein the distance used for the determination by the determination unit is a distance in a two-dimensional space on the screen between the position of the current output character and the position of the current gazed character.

9. A method for controlling an electronic device provided with a display unit configured to display text on a screen, a voice outputting unit configured to output the text as voice, and a sight-line detection unit configured to detect a sight-line direction of a user, the method comprising:
   a controlling step of changing, assuming that a position of a character that the voice outputting unit is currently outputting as voice is defined as a position of a current output character, and a position of a character in the text that is present in the sight-line direction of the user detected by the sight-line detection unit is defined as a position of a current gazed character, a starting position at which the voice outputting unit starts voice output depending on a distance between the position of the current output character and the position of the current gazed character, the controlling step including:

a determination step of determining whether or not the distance between the position of the current output character and the position of the current gazed character is equal to a preset threshold or more; and a setting step of setting the position of the current gazed character to the starting position at which the voice outputting unit starts voice output if it is determined in the determination step that the distance is equal to the preset threshold or more.

10. A non-transitory, computer-readable storage medium having stored therein a program for causing a computer, which comprises a display unit configured to display text on a screen, a voice outputting unit configured to output the text as voice, and a sight-line detection unit configured to detect a sight-line direction of a user, to execute the steps of:

a controlling step of changing, assuming that a position of a character that the voice outputting unit is currently outputting as voice is defined as a position of a current output character, and a position of a character in the text that is present in the sight-line direction of the user detected by the sight-line detection unit is defined as a position of a current gazed character, a starting position at which the voice outputting unit starts voice output depending on a distance between the position of the current output character and the position of the current gazed character, the controlling step including:

a determination step of determining whether or not the distance between the position of the current output character and the position of the current gazed character is equal to a preset threshold or more; and a setting step of setting the position of the current gazed character to the starting position at which the voice outputting unit starts voice output if it is determined in the determination step that the distance is equal to the preset threshold or more.

11. An information processing apparatus comprising:

a voice outputting unit configured to output text displayed on a screen as voice;

a sight-line detection unit configured to detect a sight-line direction of a user;

a control unit configured to control a position at which the voice outputting unit performs voice output on the basis of a distance between a position of a character in the text at which the voice outputting unit is performing voice output and a position of a character in the text that is present in the sight-line direction of the user detected by the sight-line detection unit; and a setting unit configured to, if the distance is equal to or more than a preset threshold, set the position of the character in the text that is present in the sight-line direction of the user detected by the sight-line detection unit to the starting position at which the voice outputting unit starts voice output.

12. The apparatus according to claim 11, wherein the control unit includes:

a determination unit configured to determine whether or not the distance is equal to or more than the preset threshold, wherein the setting unit is configured to, if the determination unit determined that the distance is equal to or more than the preset threshold, set the position of the character in the text that is present in the sight-line direction of the user detected by the sight-line detection unit to the starting position at which the voice outputting unit starts voice output.

13. The apparatus according to claim 11, wherein the setting unit is configured, if a state in which the distance is equal to or more than the preset threshold continues for a predetermined time duration or more, to set the position of the character in the text that is present in the sight-line direction of the user detected by the sight-line detection unit to the starting position at which the voice outputting unit starts voice output.

14. The apparatus according to claim 12, wherein the control unit further includes a velocity detection unit configured to detect a velocity at which the position of the character in the text that is present in the sight-line direction detected by the sight-line detection unit shifts; and the setting unit is configured to set the position of the character in the text that is present in the sight-line direction of the user detected by the sight-line detection unit to the starting position at which the voice outputting unit starts voice output, and to set a voice output velocity according to the velocity detected by the velocity detection unit.

15. The apparatus according to claim 12, wherein the distance is the number of characters in an arrangement of a character string in the text.

16. The apparatus according to claim 12, wherein the distance is a distance in a two-dimensional space on the screen.

17. A method for controlling an information processing apparatus provided with a voice outputting unit configured to output text displayed on a screen as voice, the method comprising:

a sight-line detection step of detecting a sight-line direction of a user;

a control step of controlling a position at which the voice outputting unit performs voice output on the basis of a distance between a position of a character in the text at which the voice outputting unit is performing voice output and a position of a character in the text that is present in the sight-line direction of the user detected in the sight-line detection step; and a setting step of setting, if the distance is equal to or more than a preset threshold, the position of the character in the text that is present in the sight-line direction of the user detected in the sight-line detection step to the starting position at which the voice outputting unit starts voice output.

18. A non-transitory, computer-readable storage medium having stored therein a program for causing a computer, which comprises a voice outputting unit configured to output text displayed on a screen as voice, to execute the steps of:

a sight-line detection step of detecting a sight-line direction of a user;

a control step of controlling a position at which the voice outputting unit performs voice output on the basis of a distance between a position of a character in the text at which the voice outputting unit is performing voice output and a position of a character in the text that is present in the sight-line direction of the user detected in the sight-line detection step; and a setting step of setting, if the distance is equal to or more than a preset threshold, the position of the character in the text that is present in the sight-line direction of the user detected in the sight-line detection step to the starting position at which the voice outputting unit starts voice output.

\* \* \* \* \*